US009236978B2

(12) United States Patent  
Homchaudhuri et al.

(10) Patent No.: US 9,236,978 B2
(45) Date of Patent: *Jan. 12, 2016

(54) SYSTEM AND METHOD FOR INFORMATION VERIFICATION BASED ON CHANNEL AWARENESS

(71) Applicant: QUALCOMM Incorporated, San Diego, CA (US)

(72) Inventors: Sandip Homchaudhuri, San Jose, CA (US); Guido Robert Frederiks, Aptos, CA (US); Geeta Hiremath, Fremont, CA (US); James Simon Cho, Mountain View, CA (US); Alireza Raissinia, Monte Sereno, CA (US); Didier Johannes Richard Van Nee, Tull en't Waal (NL)

(73) Assignee: Qualcomm Incorporated, San Diego, CA (US)

( * ) Notice: Subject to any disclaimer, the term of this patent is extended or adjusted under 35 U.S.C. 154(b) by 26 days.

This patent is subject to a terminal disclaimer.

(21) Appl. No.: 14/541,120

(22) Filed: Nov. 13, 2014

(65) Prior Publication Data

US 2015/0071084 A1    Mar. 12, 2015

Related U.S. Application Data

(63) Continuation of application No. 13/620,284, filed on Sep. 14, 2012, now Pat. No. 8,923,137.

(60) Provisional application No. 61/595,562, filed on Feb. 6, 2012.

(51) Int. Cl.
*G01R 31/08* (2006.01)
*H04L 1/20* (2006.01)
(Continued)

(52) U.S. Cl.
CPC .............. *H04L 1/201* (2013.01); *H04L 1/0045* (2013.01); *H04L 1/0053* (2013.01);
(Continued)

(58) Field of Classification Search
CPC ......................... H04L 1/0053; H04W 52/0245
USPC ................................................. 370/240–246
See application file for complete search history.

(56) References Cited

U.S. PATENT DOCUMENTS 6,006,106 A    12/1999  Cook et al.
6,131,049 A    10/2000  Marsan et al.
(Continued)

FOREIGN PATENT DOCUMENTS

CN    101056440 A    10/2007
CN    102036340 A    4/2011
(Continued)

OTHER PUBLICATIONS

Das G., et al., (Eds) Intelligent information technology, Proceedings from CIT 2004: 7th International Conference on Information Technology, Thakur, S.S., et al., "Clock Synchronization in IEEE 802.11 Ad Hoc Networks," Dec. 2004, pp. 180-189.
(Continued)

*Primary Examiner* — Asad Nawaz
*Assistant Examiner* — Syed S Ali
(74) *Attorney, Agent, or Firm* — Bay Area Technology Law Group PC

(57) ABSTRACT

This disclosure describes techniques for operating a client device to communicate with a wireless access point to validate data within a frame by comparing channel quality metrics and duration metrics to thresholds. Information received within a validity window may be treated as correctly received even if the frame fails a subsequent verification process or if reception of the frame is terminated prior to the end of the frame.

26 Claims, 9 Drawing Sheets

(51) Int. Cl.
  *H04L 1/00* (2006.01)
  *H04W 52/02* (2009.01)
  *H04L 1/24* (2006.01)
  *H04W 24/08* (2009.01)

(52) U.S. Cl.
  CPC .............. *H04L 1/0054* (2013.01); *H04L 1/20* (2013.01); *H04L 1/242* (2013.01); *H04W 24/08* (2013.01); *H04W 52/0216* (2013.01); *H04W 52/0245* (2013.01)

(56) References Cited

U.S. PATENT DOCUMENTS

| | | |
|---|---|---|
| 7,500,119 B2 | 3/2009 | Tsai |
| 7,586,948 B2 | 9/2009 | Hiddink et al. |
| 7,653,031 B2 | 1/2010 | Godfrey |
| 8,027,378 B1 | 9/2011 | Yang et al. |
| 8,099,094 B2 | 1/2012 | Marinier et al. |
| 8,165,050 B2 | 4/2012 | Ngo et al. |
| 8,279,896 B2 | 10/2012 | Etkin et al. |
| 8,284,061 B1 | 10/2012 | Dione |
| 8,301,760 B1 | 10/2012 | Zadicario et al. |
| 8,433,374 B2 | 4/2013 | Deshpande et al. |
| 2004/0146091 A1 | 7/2004 | Chang et al. |
| 2004/0190648 A1 | 9/2004 | Anim-Appiah et al. |
| 2004/0202196 A1* | 10/2004 | Sindhushayana et al. .... 370/465 |
| 2004/0203817 A1 | 10/2004 | Rao et al. |
| 2004/0218568 A1 | 11/2004 | Goodall et al. |
| 2005/0176432 A1 | 8/2005 | Kamura et al. |
| 2006/0009220 A1 | 1/2006 | Kiyomoto et al. |
| 2007/0008922 A1 | 1/2007 | Abhishek et al. |
| 2007/0047499 A1 | 3/2007 | Montojo et al. |
| 2007/0116007 A1 | 5/2007 | Xiao et al. |
| 2007/0140188 A1 | 6/2007 | Melkote et al. |
| 2007/0147321 A1 | 6/2007 | Jung |
| 2007/0165589 A1 | 7/2007 | Sakoda |
| 2007/0249354 A1 | 10/2007 | Seo et al. |
| 2007/0258419 A1 | 11/2007 | Zhao et al. |
| 2008/0101324 A1 | 5/2008 | Stark |
| 2008/0170551 A1 | 7/2008 | Zaks |
| 2008/0232373 A1 | 9/2008 | Iyer et al. |
| 2009/0034460 A1 | 2/2009 | Moratt et al. |
| 2009/0067397 A1 | 3/2009 | Seok |
| 2009/0129275 A1 | 5/2009 | Watanabe et al. |
| 2009/0227263 A1* | 9/2009 | Agrawal et al. ............ 455/452.1 |
| 2009/0238133 A1 | 9/2009 | Sakoda |
| 2009/0296864 A1 | 12/2009 | Lindoff et al. |
| 2009/0310578 A1* | 12/2009 | Convertino et al. .......... 370/338 |
| 2010/0029325 A1 | 2/2010 | Wang et al. |
| 2010/0177757 A1 | 7/2010 | Kim et al. |
| 2010/0219250 A1 | 9/2010 | Wang |
| 2010/0223524 A1 | 9/2010 | Duggan et al. |
| 2010/0223534 A1 | 9/2010 | Earnshaw et al. |
| 2010/0278065 A1 | 11/2010 | Sun et al. |
| 2011/0002234 A1 | 1/2011 | Chang et al. |
| 2011/0070836 A1 | 3/2011 | Park et al. |
| 2011/0075635 A1 | 3/2011 | Ryu et al. |
| 2011/0083065 A1 | 4/2011 | Singh et al. |
| 2011/0255618 A1 | 10/2011 | Zhu et al. |
| 2011/0305288 A1 | 12/2011 | Liu et al. |
| 2012/0082049 A1 | 4/2012 | Chen et al. |
| 2012/0094681 A1 | 4/2012 | Freda et al. |
| 2012/0129560 A1 | 5/2012 | Lunden et al. |
| 2012/0164948 A1 | 6/2012 | Narasimha et al. |
| 2012/0188998 A1 | 7/2012 | Philips et al. |
| 2012/0314636 A1 | 12/2012 | Liu |
| 2012/0321012 A1 | 12/2012 | Elenes et al. |
| 2013/0094536 A1 | 4/2013 | Hui et al. |
| 2013/0194955 A1 | 8/2013 | Chang et al. |
| 2013/0201838 A1 | 8/2013 | Homchaudhuri et al. |
| 2013/0230035 A1 | 9/2013 | Grandhi et al. |
| 2013/0315141 A1 | 11/2013 | Homchaudhuri et al. |
| 2014/0133469 A1 | 5/2014 | Lee et al. |
| 2014/0177501 A1 | 6/2014 | Seok et al. |
| 2014/0241226 A1 | 8/2014 | Jia et al. |

FOREIGN PATENT DOCUMENTS

| | | |
|---|---|---|
| EP | 1424862 A1 | 6/2004 |
| EP | 1971164 A1 | 9/2008 |
| EP | 2106192 A2 | 9/2009 |
| KR | 20060014900 A | 2/2006 |
| KR | 100813884 B1 | 3/2008 |
| WO | WO-9427377 A1 | 11/1994 |
| WO | WO-2007127940 A2 | 11/2007 |
| WO | WO-2008027907 A2 | 3/2008 |
| WO | WO-2008147130 A2 | 12/2008 |
| WO | WO-2009062185 A2 | 5/2009 |
| WO | WO-2013008989 A1 | 1/2013 |

OTHER PUBLICATIONS

International Search Report and Written Opinion—PCT/US2013/023501—ISA/EPO—Apr. 16, 2013.

* cited by examiner

SYSTEM AND METHOD FOR INFORMATION VERIFICATION BASED ON CHANNEL AWARENESS

RELATED APPLICATIONS

This application is a continuation of U.S. patent application Ser. No. 13/620,284 filed Sep. 14, 2012 and claims priority of provisional patent application Ser. No. 61/595,562 filed Feb. 6, 2012.

FIELD OF THE PRESENT INVENTION

This disclosure relates generally to wireless networking. More specifically, this disclosure relates to techniques for validating information received in a transmitted frame prior to receiving the end of the frame.

BACKGROUND OF THE INVENTION

A wireless network may comprise an access point and at least one client device. The access point may be coupled to a network, such as the Internet, and enable the client device to communicate via the network (and/or communicate with other devices coupled to the access point). Generally, the wireless access point may send data to the at least one client device in the form of one or more frames. To reduce power consumption, a client device may operate in a low power consumption mode (e.g., a sleep mode) in some circumstances, such as when the client device is not being used for communications (e.g., with the access point). Under the IEEE 802.11X (e.g., 802.11b, 802.11g, 802.11n) standards for WI-FI communications, a client device may periodically awake from a low power consumption mode, and receive a beacon from an access point. The beacon may include information regarding present or future communications between the client device and the access point. According to one example, the beacon may include information such as a traffic indication map (TIM) and/or a delivery traffic identification message (DTIM) information elements (IE) that indicates whether frames of data are waiting to be communicated to the client device. Further, the beacon may also contain other information pertinent to the operation of the network, delivered as an IE or in other suitable manners.

To provide further power saving advantages, techniques have been developed to maximize time spent in low power mode, allowing the device to return to a low power mode of operation before an entire beacon is received by the client device. For example, a client device may awake from a low power mode of operation to receive a first portion of a beacon. As discussed above, a portion of the beacon may include information related to communications with the access point, such as an indication of whether one or more frames of data are forthcoming from the access point (e.g., waiting to be sent to the client device). In some embodiments, this information is contained in the DTIM. If the information from the access point indicates no frames of data are forthcoming, the client device preferably returns to a low power consumption mode of operation before receiving subsequent portions of the beacon. As will be appreciated, such techniques allow the client device to spend a greater portion of time in low power mode, reducing the overall power consumption associated with access point communications. Such strategies are generally referred to herein as early beacon termination (EBT) techniques and are known in the art.

Despite the power saving advantages represented by EBT techniques, it would be desirable to optimize certain performance aspects. Typically, wireless communication devices are designed so that important system parameters will not be updated on the basis of a received frame unless the integrity of that frame can be confirmed. One example is the time synchronization function (TSF) used to keep the clocks on the client device and the access point coordinated. Since synchronization is critical to proper functioning, the client device will not update its TSF unless there is reasonable confidence in the validity of the timing information transmitted by the access point. However if the client device is not able to validate the TSF for a sufficient period of time, clock drift that affects each device may result in the client device being out of synchronization with the access point, impairing performance. Another important system parameter relates to coordinated channel switching involving the access point and a client device. The access point may indicate an imminent switch to a different channel, such as to avoid interference, using the channel switch announcement (CSA) IE. Since transmission will be interrupted if the client device switches channels erroneously, it is generally desirable to have a high degree of confidence in the validity of the CSA IE before implementing a switch.

Positioning of the DTIM within the beacon may not be mandated by the wireless specifications, but often occurs relatively early and before validation information which typically comes towards the end of transmissions. In the IEEE 802.11X protocols, for example, frames end with a frame check sequence (FCS) IE that allows the client device to verify the integrity of the received frame. Similarly, other network information may also be contained in the beacon and positioned at various point relative to the FCS. Accordingly, when a period time elapses during which the access point has no frames to transmit to the client device, EBT will result in the client device returning to low power mode before the FCS. In turn, information transmitted by the access point cannot be verified and parameters such as TSF and CSA may not be updated. System parameters relying on other network information may be similarly affected.

Another aspect of the impact of EBT strategies results from the architecture of the beacon frame. As noted earlier, IEEE 802.11X protocols generally result in the DTIM occurring relatively early in the beacon frame. This is followed by a variable number of additional IEs and finally by the FCS. As a practical matter, channel conditions change constantly in a typical wireless communication system. Thus, there are situations in which the channel is good enough for valid reception during the DTIM, but the quality will erode over the successive IEs and ultimately fail the FCS. This may occur when the time between the DTIM and the FCS exceeds the coherence time of the channel or if there is a deep fade in the signal during the period. While the former may be equalized to some extent by efficient pilot interpolation, which is optionally applied due to varying degrees of implementation complexities, the latter would certainly result in irrecoverable errors and lead to FCS failures. Under prior EBT mechanisms, the client device simply discards the frame even though the DTIM was set because the channel has degraded to the point that the FCS fails, even though the DTIM or other network information may have been received while the channel was still valid. Correspondingly, under such situations, the performance of the client device will suffer since it is disregarding valid data, such as missing the opportunity to respond to the access point with a power save poll (PS-POLL) to enable the access point to deliver waiting frames to the client device or failing to update important system parameters.

Accordingly, it would be desirable to provide a wireless communication system that features the power saving benefits represented by an EBT function while minimizing the impact on performance. To that end, it would be desirable for a client device to be able to update important system parameters even when the client device is not receiving a beacon transmission in its entirety. It would also be desirable to provide such a wireless communication system that can utilize a valid DTIM or other IE even when the channel degrades over time and causes the FCS to fail. This disclosure is directed to systems and methods that accomplish these and other goals.

SUMMARY OF THE INVENTION

In accordance with the above needs and those that will be mentioned and will become apparent below, this disclosure is directed to a client device for communicating with a wireless access point, wherein the client device includes a data processing module configured to receive at least a portion of a frame transmitted by the access point to an intermediate location within the frame and a channel assessment module configured to determine a validity window with respect to the intermediate location when at least one channel quality metric is greater than or equal to a given threshold, wherein data processing module is configured to validate information received within the validity window.

In one aspect, wherein the channel assessment module may be configured to determine the validity window by setting a range of symbols upstream and downstream of a period of time when the channel quality metric is determined. Further, the channel quality metric may be confidence metrics from the output of a Viterbi decoder.

In another aspect, the channel assessment module may be configured to determine the validity window based upon a coherence time for a channel used to transmit the frame. Additionally, the channel quality metric may include a receiver error vector magnitude. The channel quality metric may also be based upon signal strength of the frame. Further, the given threshold may be based upon the modulation coding set used for the transmitted frame.

In some embodiments, the client device may be configured to update system parameters based upon the information received within the validity window. As desired, the client device may be configured to terminate reception of the frame when the channel quality metric does not exceed the given threshold.

Another aspect of the disclosure relates to channel assessment module being configured to determine a plurality of validity windows, such that each validity window is determined in reference to a channel quality metric determined at a different time during the frame.

Some embodiments include receiving the frame though a verification field such that the channel assessment module may be configured to diagnose a failure of the verification field on the basis of a duration metric and a difference between a first channel quality metric measured during a preamble of the frame and a second channel quality metric measured during a time corresponding to the intermediate location, wherein the information within the validity window is validated when the failure diagnosis is attributable to deteriorating channel conditions.

In yet another aspect, when the information received within the validity window is a DTIM information element, the client device may be configured to terminate reception of the frame and enter a low power mode if the DTIM information element indicates there is no pending data at the access point for the client device.

In some embodiments, the channel assessment module may be further configured to assign a confidence level to the validity window based upon the channel quality metric and the given threshold.

Further, the channel assessment module may be configured to determine the validity window by comparing a first duration metric corresponding to a time period between a preamble of the frame and the intermediate location to a coherence time and determining whether a channel quality metric determined from the preamble exceeds a given threshold. In such embodiments, the channel assessment module may also determine the validity window by comparing a second duration metric corresponding to a time period between the intermediate location and a verification field to a coherence time and comparing the difference between the first channel quality metric and a second channel quality metric to a channel quality difference threshold.

This disclosure is also directed to a method for wireless communication with an access point, including the steps of receiving at least a portion of a frame transmitted by the access point to an intermediate location within the frame with a client device, determining a channel quality metric, establishing a validity window when the channel quality metric is greater than or equal to a given threshold, and validating information from the frame received within the validity window.

In one aspect, establishing the validity window may include setting a range of symbols upstream and downstream of a period of time when the channel quality metric is determined.

Further, determining the channel quality metric may include obtaining confidence metrics from the output of a Viterbi decoder. Additionally, establishing the validity window may include using a range based upon a coherence time for a channel used to transmit the frame.

In some embodiments, determining the channel quality metric may include measuring a receiver error vector magnitude. Determining the channel quality metric may also include measuring a signal strength of the frame.

Additionally, the given threshold may be based upon the modulation coding set used for the transmitted frame.

The method may also include updating system parameters of the client device based upon the information received within the validity window. As desired, the method may include terminating reception of the frame when the channel quality metric does not exceed the given threshold.

Yet another aspect may include determining a plurality of channel quality metrics at different times during the frame and establishing a plurality of validity windows, each validity window corresponding to the plurality of channel quality metrics.

When the frame is received though a verification field, the method may include diagnosing a failure of the verification field on the basis of a duration metric and a difference between a first channel quality metric measured during a preamble of the frame and a second channel quality metric measured during a time corresponding to the intermediate location, wherein the information within the validity window is validated when the failure diagnosis is attributable to deteriorating channel conditions.

Further, when the validated information includes a DTIM information element, the method may also include terminating reception of the frame and placing the client device in a low power mode if the DTIM information element indicates there is no pending data at the access point for the client device.

In one embodiment, the method may also include assigning a confidence level to the validity window based upon the channel quality metric and the given threshold.

In some embodiments, establishing the validity window may include comparing a first duration metric, corresponding to a time period between a preamble of the frame and the intermediate location to a coherence time and determining whether a channel quality metric determined from the preamble exceeds a given threshold. Establishing the validity window may further include comparing a second duration metric corresponding to a time period between the intermediate location and a verification field to a coherence time and comparing the difference between the first channel quality metric and a second channel quality metric to a channel quality difference threshold.

The details of one or more examples of this disclosure are set forth in the accompanying drawings and the description below. Other features, objects, and advantages of the techniques described herein will be apparent from the description and drawings.

BRIEF DESCRIPTION OF THE DRAWINGS

Further features and advantages will become apparent from the following and more particular description of the preferred embodiments of the invention, as illustrated in the accompanying drawings, and in which like referenced characters generally refer to the same parts or elements throughout the views, and in which.

DETAILED DESCRIPTION OF THE INVENTION

Figure 1:
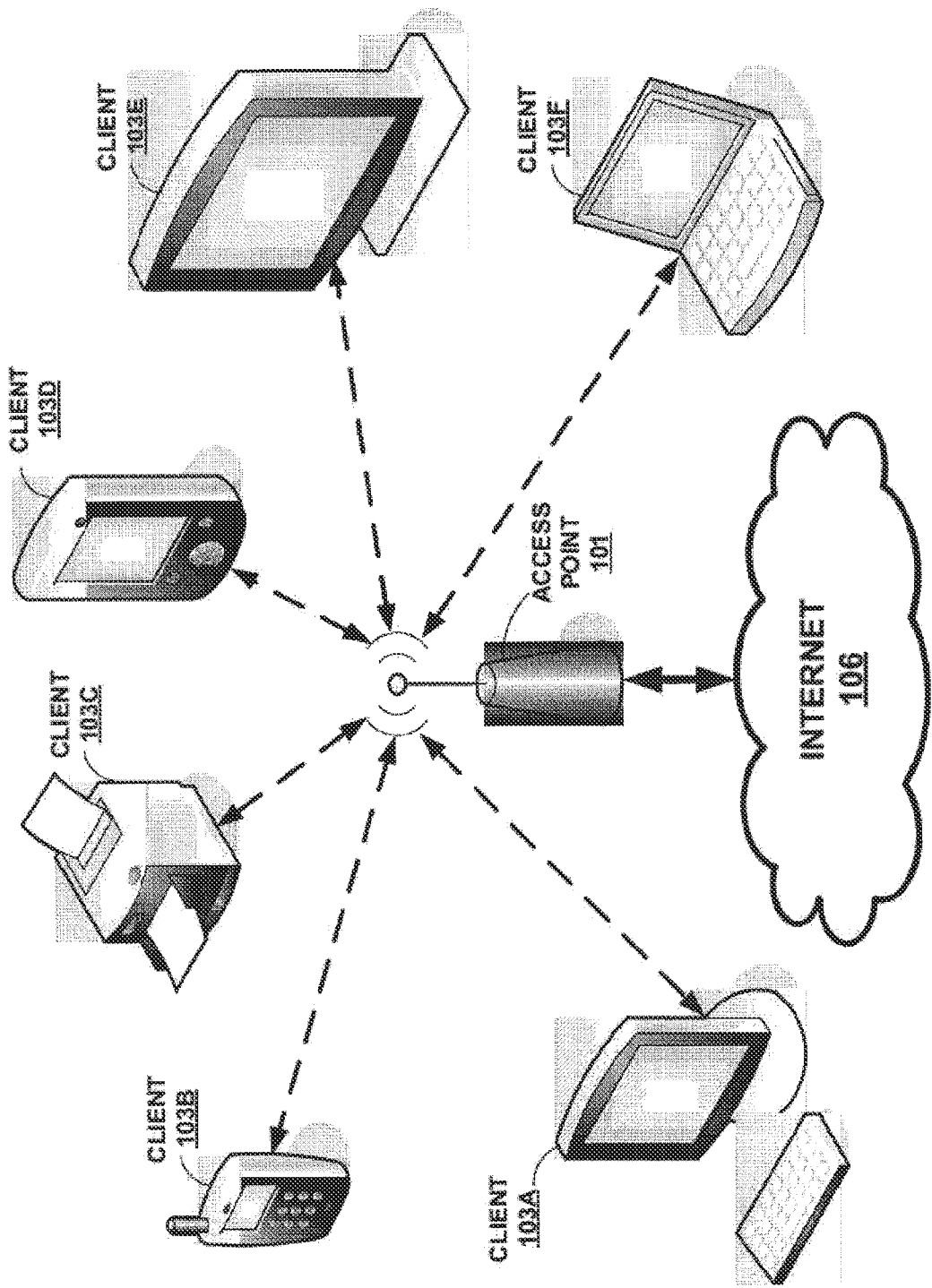
FIG. 1 is a conceptual diagram that illustrates one example of an access point configured to generate a wireless network that may be used according to the invention.

At the outset, it is to be understood that this disclosure is not limited to particularly exemplified materials, architectures, routines, methods or structures as such may, of course, vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, may refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As such, techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a tangible processor-readable storage medium comprising instructions that, when executed, performs one or more of the methods described above. The tangible processor-readable data storage medium may form part of a computer program product, which may include packaging materials. Accordingly, embodiments described herein may be discussed in the general context of processor-executable instructions residing on some form of processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

By way of example, and not limitation, the tangible processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a processor-readable communication medium that carries or communicates code in the form of instructions or data structures and that can be accessed, read, and/or executed by a computer.

The instructions may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements.

In the figures, a single block may be described as performing a function or functions; however, in actual practice, the function or functions performed by that block may be performed in a single component or across multiple components, and/or may be performed using hardware, using software, or using a combination of hardware and software. Also, the exemplary radio modules, RF components, and end products may include components other than those shown, including well-known components such as a processor, memory and the like.

For purposes of convenience and clarity only, directional terms, such as top, bottom, left, right, up, down, over, above, below, beneath, rear, back, and front, may be used with respect to the accompanying drawings or particular embodiments. These and similar directional terms should not be construed to limit the scope of the invention in any manner and may change depending upon context. Further, sequential terms such as first and second may be used to distinguish similar elements, but may be used in other orders or may change also depending upon context.

As used herein, the term "DTIM" refers to both the delivery traffic indication message as well as the traffic indication message (TIM) IEs defined by IEEE 802.11 protocols. Generally, when the DTIM is set, the access point is indicating that broadcast data is ready to be transmitted and the client device prepare to receive data frames. Likewise, when TIM is set, the access point is indicating that data specific to the client device is ready to be transmitted and the client device responds that it is ready to receive that data by sending a PS-POLL message. However, the techniques of this disclosure are applicable to any other suitable wireless communication system. Accordingly, this term is also used herein to refer to any portion of a beacon transmission containing information about data waiting to be sent to a client device.

Further, embodiments are discussed in specific reference to wireless networks. As such, this disclosure is applicable to any suitable wireless network having the necessary characteristics, including wireless local area networks (WLAN), particularly those governed by IEEE 802.11 protocols, as well as wireless fidelity (WiFi), Wibree™, ultra wideband (UWB), Long Term Evolution (LTE), Enhanced Data for GSM Evolution (EDGE), Evolution Data Optimized (EVDO), General Frame Radio Service (GPRS) networks and others.

Unless defined otherwise, all technical and scientific terms used herein have the same meaning as commonly understood by one having ordinary skill in the art to which the disclosure pertains.

Further, all publications, patents and patent applications cited herein, whether supra or infra, are hereby incorporated by reference in their entirety.

Finally, as used this specification and the appended claims, the singular forms "a, "an" and "the" include plural referents unless the content clearly dictates otherwise.

Aspects of this disclosure discussed herein are directed to improving the performance of a wireless communication system by assessing channel conditions at a receiving device and using a series of channel awareness parameters, including a channel quality metric (CQM), in order to define a validity window during which received information may be treated as correct even if reception of the frame is terminated prematurely or if the frame fails conventional verification. Suitable information that may form the basis for determining a CQM include one or more measurements associated with the channel, including signal strength measurements such as signal to noise ratio (SNR), signal plus interference to noise ratio (SINR), and received signal strength indicator (RSSI), which preferably are obtained directly from the physical layer (PHY) of the device receiving the frame. In one aspect, the preamble of an IEEE 801.11X frame contains the necessary Short Training Field (STF) and Long Training Field (LTF) signals to compute the CQM. Further, the CQM may include confidence metrics from the Viterbi decoder output. Yet another suitable CQM may be the Receiver Error Vector Magnitude (Rx-EVM), as derived from the difference between the ideal and observed constellation points after symbol demodulation of the instantaneous pilots. As desired, these values may be used singly, as a composite or in some other combination. Also preferably, these measurements are available for each antenna or in multiple input systems having receive diversity, the CQM may be a maximal ratio combined (MRC) composite, or other suitable combination. In some aspects, the characteristic used for the CQM may be updated more frequently. For example, the SNR metric may be determined in prior art devices only at the end of the frame. However, it may be desirable to determine the SNR after every symbol or at defined intervals.

FIG. 1 is a conceptual diagram that illustrates one example of a wireless access point 101. Generally speaking, access point 101 may comprise one or more devices operative to generate a wireless local area network (WLAN) to communicatively couple one or more of client devices 103A-103F with one or more other computing devices (not shown in FIG. 1) via a larger, non-local network, such as a wide area network (WAN), or such as Internet 106, which is sometimes referred to as a global computer network. According to the non-limiting example of FIG. 1, access point 101 is configured to generate a local wireless network for one or more of a desktop computer 103A, a mobile phone 103B, a printer 103C, a smart phone or tablet computing device 103D, a television display 103E, and a laptop computer 103F. Access point 101 may also or instead operate to enable many other types of devices not specifically shown in FIG. 1 to communicate with one another via the local wireless network and/or Internet 106, and/or with other devices via Internet 106. For example, client devices 103A-103F may include any device that includes a communications module configured to enable the respective client device to wirelessly communicate with access point 101. According to one such example, where access point 101 is configured to generate a wireless local area network, such as an IEEE 802.11x, or so-called WI-FI network, wireless client devices 103A-103F may include any device with a WI-FI component (e.g., application specific integrated circuit (ASIC), field programmable gate array (FPGA), discrete logic and/or software executable by a processing device) configured to enable WI-FI communications with access point 101.

Access point 101 may use a wired or wireless communications protocol to establish a communications link with Internet 106, and/or with a wide area network. For example, access point 101 may utilize one or more of a cable modem, a digital service link (DSL) modem, an optical communications link such as a T1 or T3 line, or any other form of wired communications protocol to communicatively couple access point 101 to Internet 106. According to other examples, access point 101 may be wirelessly coupled to Internet 106. For example, access point 101 may be wirelessly coupled to Internet 106 via a cellular communications network (e.g., 3G, 4G), satellite communications network, or other form of wireless communications that enables access point to communicate via Internet 106.

In some examples, access point 101 may include a device specifically configured to communicatively couple one or more client devices 103A-103F to Internet 106, such as a wired (e.g., Ethernet) or wireless (e.g., WI-FI) router, or a cellular to WI-FI hotspot device. According to other examples, access point 101 may comprise a more general purpose computing device (e.g., such as one or more of client device 103A-103F) configurable to generate a local network. For example, access point 101 may comprise a mobile phone or tablet computer configured to generate a WI-FI wireless network from a wireless cellular network connection. In some examples, one or more devices 103A-103F may also further be configurable to operate as a client device, an access point, or both simultaneously, consistent with the techniques described herein.

In some examples, one or more of client devices 103A-103F may communicate with access point 101 via a wired or wired connection. For example, when a cable (e.g., an Ethernet cable, USB cable, or the like) is coupled between the respective client device 103A-103F and access point 101, the client device may use a wired communications protocol (e.g., ETHERNET, UNIVERSAL SERIAL BUS (USB)) to communicate with access point 101. However, when such a cable is not coupled between the respective client device 103A-103F and access point 101, the client device may instead use a wireless network (e.g., WI-FI) to communicate with access point 101.

In some examples, where access point 101 is configured to generate a local wireless network, access point 101 may communicate with one or more of client devices 103A-103F by sending data arranged into one or more frames. For example, access point 101 may send to one or more of client device 103A-103F one or more frames of data received from another computing device accessible via Internet 106, or from another of client devices 103A-103F. Access point 101 may also be configured to receive one or more frames of data from one or more of client devices 103A-103F, and send the one or more received frames to another computing device accessible via Internet 106, and/or another of the one or more client devices 103A-103F.

In some examples of wireless communication techniques, such as one or more of the IEEE 802.11X (e.g., 802.11a, b, g or n) standards for WI-FI communications, some client devices 103A-103F may be configured to operate in a low power consumption (sleep) mode, when the client device is not actively operating to communicate. According to such a low power mode, the client device 103A-103F may modify operation of one or more components of the client device. For example, a client device 103A-103F operating in such a low power consumption mode may turn off (e.g., disconnect from a power supply) one or more components (e.g., communications modules of the client device) that operate to enable communications with access point 101 or another device (e.g., one or more other client devices 103A-103F). In other examples of such a low power consumption mode, the client device may also or instead modify operation of the client device by operating one or more components at a lower voltage and/or lower operating power and/or speed than in an active mode of operation.

In some examples, a client device 103A-103F may periodically awake from a low power mode, to receive a beacon from access point 101. Such a beacon may be provided by a wireless signal, and may include information regarding further communications with the access point 101. As discussed above, each beacon may include a plurality of IEs that may each indicate, to or more of client devices 103A-103F, information regarding present or future communications with access point 101. For example, the plurality of IEs may indicate details regarding further communications between access point 101 and one or more of client devices 103A-103F, among other information.

In some examples, access point 101 may send one or more of client devices 103A-103F a beacon that includes an IE that comprises a DTIM. The DTIM may indicate whether access point 101 has one or more frames of data to communicate to the client device 103A-103F. As will be described herein, client device 103A-103F preferably is configured to enter a low power mode upon determination of a valid DTIM indicating no data is forthcoming from access point 101.

According to some techniques for wireless communication (e.g., the IEEE 802.11X WIFI standards), a client device may periodically awake from sleep to receive a beacon from an access point, and remain in an active state until all the data of the beacon (e.g., all IEs of the beacon) have been received and/or processed by the client device. Once all the data has been received by the client device, the client device may then verify the received data, such as by performing a FCS (for example, performing a cyclic redundancy check (CRC)) on the received beacon. Once the data of the beacon has been verified, the client device may use the verified data to operate the client device, such as by configuring system parameters of client device 103A-103F to facilitate further communication with access point 101.

After receiving the entire beacon and performing the FCS check on data of the beacon, the client device may return to the low power consumption mode of operation described above, if no frames of data are forthcoming from the access point. However, if the DTIM message of the beacon indicates that there are frames of data forthcoming (e.g., waiting to be sent to the client device) from the access point, the client device may remain in an active mode (not return to a low power consumption mode) after receiving the beacon, to receive the forthcoming frames.

In some examples, a beacon may be relatively large (e.g., a relatively large number of bits of data). According to these examples, a client device may remain in an active state for a significant amount of time to receive and/or process a beacon. In some examples, periodically waking to receive an entire beacon may cause an undesirable drain on power resources of a client device. In some examples, power consumption of a client device may be reduced by reducing the wake-up frequency at which the client device awakens from a low power consumption mode to receive beacons from the access point. This approach, however, may cause a reduction in the rate at which data is communicated, because the transmission of frames from the access point may be delayed due to the reduced wake-up frequency of the client device.

Figure 2:
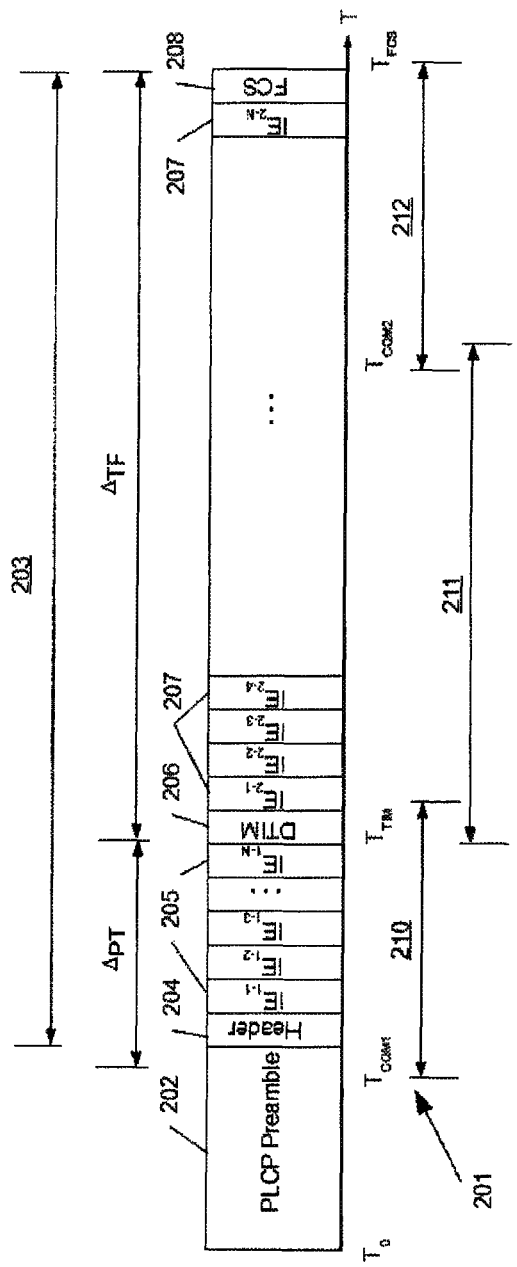
FIG. 2 is a conceptual diagram that illustrates one example of a frame that may be communicated by an access point to a client device.

Generally, wireless communication systems utilize management frames such as a beacon to communicate the information necessary to configure the access point and client devices. Each management frame is composed of a series of information elements (IEs) that correspond to various system parameters and other network characteristics. As referenced above, some of the embodiments of the disclosure are discussed primarily with regard to general IEEE 802.11X protocols. In this context, FIG. 2 is a conceptual diagram that illustrates one example of a beacon frame 201 adhering to IEEE 802.11X protocols. It should be recognized that the following techniques are applicable to other IEEE 802.11X frames as well as to other wireless systems that may use different architectures but have analogous features.

Beacon 201 is sent by access point 101 and at least a portion may be received and/or processed by a client device 103A-103F according to the techniques described herein. Generally speaking, beacon 201 may be periodically transmitted by a wireless access point (e.g., access point 101 depicted in FIG. 1) to a wireless client device (e.g., one or more of client devices 103A-103F depicted in FIG. 1). The beacon may include DTIM information regarding the further communication of data by wireless access point 101 to client device 103A-103F, as well as other information such as TSF, CSA and the like.

The exemplary beacon 201 comprises a sequence of transmitted information, initiating with physical layer convergence protocol (PLCP) preamble 202, starting at time $T_0$. In some embodiments, as will be discussed below, an initial channel quality metric (CQM) may be measured during preamble 202, such as at $T_{CQM1}$. Next is the physical layer service data unit (PSDU) 203 frame which has three relevant transition points. The start of the PSDU frame 203 occurs subsequent to $T_{CQM1}$ with transmission of header 204, which may include information regarding one or more other components of beacon 201. For example, header 204 may indicate what information is included in beacon 201, a location of particular information within beacon 201, a length of beacon 201, and/or other information. Header 204 is followed by a plurality of IEs 205 directed to system parameters including the DTIM, TSF, CSA IEs and others. As will be appreciated, the relative positions of the various IEs may vary.

At a desired location within the body of beacon 201, an intermediate IE may be identified to facilitate a determination of a CQM corresponding to the intermediate IE or other IEs. In the specific examples discussed below that are provide for illustration and not limitation, the intermediate IE may be DTIM IE 206 sent at time $T_{TIM}$, as shown. In other embodiments, other IEs may be used as desired. As noted above, DTIM IE 206 may indicate whether or not access point 101 has one or more frames of data to send to client device 103A-103F. According to at least some aspects of this disclosure, client device 103A-103F may identify DTIM IE 206 based on information of header 204 and/or header information of DTIM IE 206, and process DTIM IE 206 to determine whether access point 101 has any frames to send to the client device.

In some embodiments, an intermediate CQM may be measured at the time the intermediate IE is received to determine a validity window as described below. Alternatively, the intermediate CQM may be measured at a time occurring before or after the intermediate IE is received. Preferably, when the intermediate CQM is measured at a time that is not coincident with the reception of the intermediate IE, it may be measured within the validity window during which it may be expected that the measure CQM will apply to the time at which the IE is received. For example, the validity window may be established, at least in part, by the coherence time ($T_C$) of the channel. Further, as will be appreciated, a plurality of intermediate CQMs may be measured at or near a corresponding plurality of intermediate IEs distributed throughout beacon 201.

DTIM IE 206, or another suitable intermediate IE, is succeeded by another plurality of IEs 207 and beacon 201 is terminated by FCS 208 at $T_{FCS}$. The techniques of this disclosure make reference to two duration metrics associated with periods of time within beacon 201, measured in reference to DTIM IE 206, or another suitable intermediate IE. As shown, the first duration metric is the preamble to DTIM duration, $\Delta_{PT}$, and the second duration metric is the DTIM to KS duration, $\Delta_{TF}$. The start of PSDU frame 203 occurs at $T_{CQM1}$, representing the first portion of the transmission for which there is CQM information when an initial CQM is measured during the PLCP preamble 202.

In some situations, there are a significant number of IEs 205 and 207, such as 40-60 or more. As a result, beacon 201 may require a significant period of time to transmit, during which channel conditions may change. When channel conditions deteriorate, they may reach a level at which the beacon is subject to errors, such as burst symbol erasures and others, rendering the data from the rest of beacon 201 invalid and resulting in the verification failure of ITS 208. This stage is indicated on FIG. 2 by the time $T_{CQM2}$, at which point a terminal CQM is determined.

In view of the specific time points discussed above, this disclosure refers to three specific zones. $T_{CQM1}$ marks the beginning of a first coherent zone, PTTh zone 210, corresponding to the time between the header 204 and incorporating DTIM IE 206. Next is a second coherent zone, TFTh zone 211, beginning at $T_{TIM}$ and running to $T_{CQM2}$, a point at which the channel assumptions of zone 210 are no longer valid. As will be appreciated, these zones are defined, at least in part, by the $T_C$ of the channel. Finally, an error zone 212 corresponds to the portion of beacon 201 in which the channel may have degraded, from the zone 210 and 211, to a degree that the information is not correctly decoded. As can be seen, this includes $T_{CQM2}$ and runs until $T_{FCS}$ at FCS 208. Depending upon the positioning of DTIM IE 206 within the beacon 201 and $T_C$, zones 210, 211 and 212 may overlap to some degree, such as by one or more IEs. In the embodiments discussed herein, PTTh zone 210 and TFTh zone 211 overlap by at least DTIM IE 206 and may be used to determine the validity window.

The above discussion relates to the reception of a beacon frame 201 by client device 103A-103F. As will be appreciated, the techniques of this disclosure may be extended to other types of frames, such as other management frames, control frames or data frames. Although such frames may not include a DTIM IE 206, other suitable intermediate IEs may be used in a similar manner. In particular, it will be appreciated that a validity window may be established with regard to any desired IE located at an intermediate location of the frame so that the information may be verified prior to receiving the entire frame. As such, reception of the frame may be terminated after receiving the desired IE to provide increased power efficiency as compared to receiving the entire frame.

Next, a channel quality threshold (CQTh) may be empirically set to a value which reflects a given percentage of confidence that FCS verification will (or would) succeed, referred to herein as the FCS confidence level (FCL) and can be viewed as the percentage chance that the information received to this point has been decoded correctly. As will be appreciated, the FCL may be adjusted as desired depending upon performance goals, design constraints and the like. In a currently preferred embodiment, the FCL may be in the range of approximately 80 to 90%. As will be described, a CQM greater than the CQTh allows the determination of a corresponding validity window.

For example, when the CQM is the SNR, a suitable CQTh may correspond to a value that is approximately 2 dB greater than the minimum SNR associated with the Modulation/Coding Set (MCS) used to transmit the frame. Similarly, when the CQM is the Rx-EVM, a suitable CQTh may be established in relation to the minimum required by the MCS being used.

In another example, the Viterbi confidence metrics may be observed over a suitable traceback length, such as 10 orthogonal frequency division modulation (OFDM) symbols or approximately 100-128 bits, and compared to a CQTh corresponding to the desired FCL. In one aspect, a Viterbi confidence metric may be determined by selecting a minimum path metric such that it exceeds a sum of the absolute values of all soft Viterbi values corresponding the current frame that have been output. The sum of soft Viterbi values may be scaled by a suitable threshold factor, such as a 6-bit number and performing a right-shift bit operation to generate a suitable range of 0 to 63/256. For some embodiments, when the received frame is not in the IEEE 802.11n protocol but includes a legacy signal field (L-SIG), the state 0 metric at the end of L-SIG decoding may be chosen as the minimum path metric. In another aspect, the Viterbi confidence metric may be determined by the difference between the next smallest minimum path metric and the minimum path metric, such that the difference is below a suitable threshold.

In yet another example, for systems employing an IEEE 802.11b protocol, a running Rx-EVM may be used given that the structure of the preamble may not allow use of the other CQMs described above. Further, using the confidence metrics of the Viterbi output to augment the determination based on Rx-EVM may provide improved results.

The coherence time of the channel, $T_C$, is also determined as known to those of skill in the art. For example, based upon an IEEE TGn channel-B correlation time profile, the coherence time varies depending upon the relative motion between the stations. In generally, greater relative motion corresponds to shorter coherence time, such as 4.2 ms given a relative speed of 4.0 km/h, typical in IEEE 802.11X limited mobility scenarios. The channel coherence time is usually reduced to fractions of milliseconds in vehicular conditions common in cellular communications, where system designers account for mobility in the 300 km/h range. In one aspect, the coherence time applicable to IEEE TGn standard can be determined based the following equation:

$$T = \frac{\sqrt{A}}{2\pi f_d} \cdot \ln(2) \qquad (1)$$

in which T is the coherence time $T_C$, $f_d$ is the Doppler spread and A is a constant.

Relevant to the PTTh, zone 210 referenced above, a preamble to DTIM threshold, PTTh, is established corresponding to the period of time between the generation of the CQM at $T_{CQM1}$ and the DTIM IE 206 at $T_{TIM}$. This threshold should be set to period of time during which it can reasonably be expected that the channel will be sufficiently uniform and stable to accurately transfer information from access point 101 to client device 103A-103F. Depending upon the number of IEs 205 included in beacon 201, $\Delta_{PT}$ may exceed PTTh. Relevant to the TFTh zone 211, a DTIM IE 206 to $T_{CQM2}$ threshold, TFTh, is set to a period of time during which it can be expected that the channel is sufficiently coherent to allow correct decoding of the beacon information. If FCS 208 is beyond the TFTh zone, there is a finite probability that verification may fail due to channel impairments, introduced in the error zone 212. Similarly, depending upon the number of IEs 207 included in beacon 201, $\Delta_{TF}$ may exceed TFTh.

A further parameter associated with the channel assessment techniques of this disclosure is an N-update value that corresponds to the number of IEs that may be trusted within the PTTh zone 210 and TFTh zone 211 based upon the relationship between CQM taken at $T_{CQM1}$ and CQTh. In one embodiment, a value for N-update is pre-established based on testing or in any other suitable manner and may be implemented any time CQTh is met. In a further aspect, N-update may be dynamically revised based upon the degree to which the first CQM, computed at $T_{CQM1}$, exceeds CQTh. Accordingly, PTTh zone 210 and TFTh zone 211, as optionally modified by the N-update value, may be considered a validity window for the purposes of this disclosure As discussed above, the terminal CQM, measured at $T_{CQM2}$, may be computed to evaluate the degree to which the channel is changing. Accordingly, a $\Delta_{CQTh}$ value is set that corresponds to the maximal difference between the CQMs taken at $T_{CQM1}$ and $T_{CQM2}$ to reasonably ensure the channel has not degraded to a degree that would prevent correct decoding of the data transmitted by access point 101. IEEE 802.11X receivers, including client devices 103A-103F, may be configured to supply values, such as SNR, SINR and RSSI, used to compute the CQM during the preamble from the short or long training symbols and from the pilot error vector magnitude (EVM.) Since the CQM computed at $T_{CQM2}$ occurs outside the preamble, training symbols are not available for the computation and conventional wireless receivers may not be configured to perform some types of CQM measurements subsequent to the preamble. Accordingly, in one embodiment of this disclosure, pilot symbols specifically from TFTh zone 211 may be analyzed to determine the zonal SNR. In another embodiment the CQM, computed at $T_{CQM1}$, may be continuously adjusted from the Pilot EVM at each OFDM symbol leading up to the $T_{CQM2}$ instant. While advanced signal processing techniques can be applied for this continuous adjustment, a fairly simple, but sufficiently reasonable, algorithm would be to store the first channel noise contribution at $T_{CQM1}$, excluding the Noise Figure of the analog (RF) front-end, followed by per-symbol Pilot EVM evaluation and adjusting, adding or subtracting, the first channel noise by an exact or fractional amount the Pilot EVM has differed, leading up to the $T_{CQM2}$ zone. As desired, any other suitable technique may be employed to determine CQM at $T_{CQM2}$.

Accordingly, the above parameters including the CQMs determined at different times during the reception of a frame, the CQTh, the duration metrics, the coherence zones, and/or the N-update values may be employed to determine a validity window within a frame being received such that IEs or other information inside the window may be verified as being correctly received at a corresponding FCL level and utilized even if the reception of the frame is terminated prematurely or the FCS check fails. In a first aspect, the validity window may be determined by assessing whether a first duration metric corresponding to the time period between the preamble and reception of intermediate IE is within the coherence time expected for the channel. If the initial CQM exceeds an appropriate CQTh, the validity window may be defined as spanning the period between the reception of the preamble and the reception of intermediate IE corresponding to PTTh Zone 210, with a degree of confidence FCL related to the CQM. In a second aspect, determining that an intermediate CQM exceeds a corresponding CQTh may establish a validity window encompassing a given intermediate IE. As discussed above, if the CQM comprises the confidence metrics from the output of the Viterbi decoder or a running Rx-EVM, greater than the minimum required for that given MCS, a CQM value exceeding the appropriate CQTh may indicate the channel is valid within range of symbols upstream and downstream of the time the CQM is determined. In one embodiment, a validity window may not be continuously updated and the last determined CQM may be considered applicable for at least a period of time corresponding to the $T_C$ of the channel.

Figure 3:
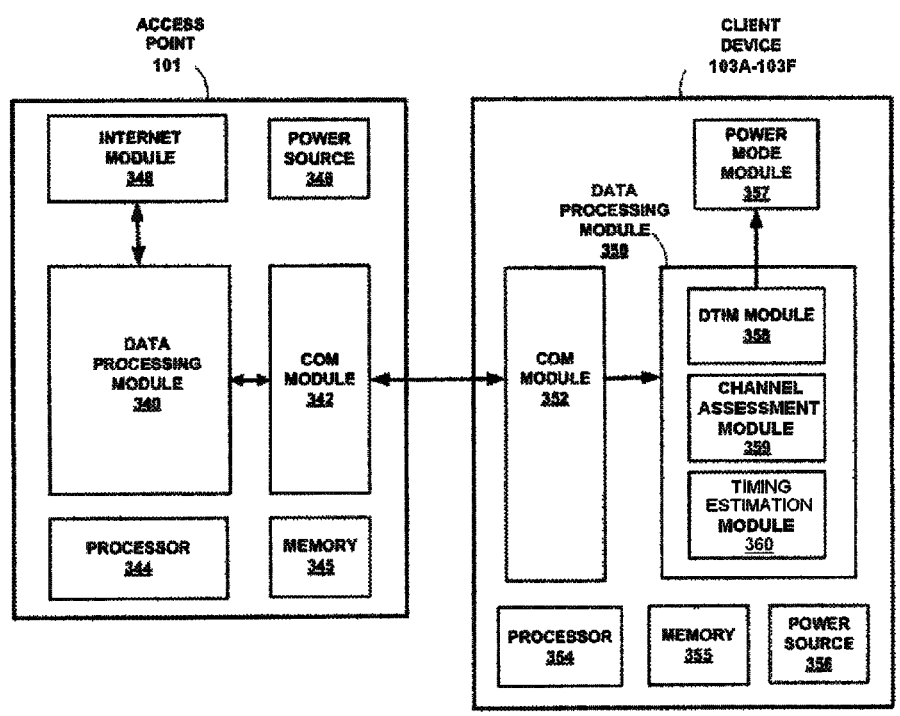
FIG. 3 is a block diagram that illustrates one example of an access point and a client device configured to operate according to one embodiment of the invention.

Turning now to FIG. 3, a block diagram illustrates one example of a wireless client device 103A-103F configured to communicate with an access point 101 consistent with the techniques described herein. As shown in FIG. 3, access point 101 includes an Internet module 348, a power source 346, a processor 344, a memory 345, a data processing module 340, and a communications module (COM module) 342.

Memory 345 may include any component of access point 101 configured to store data. For example, memory 345 may include a temporary memory, such as one or more random access memory (RAM) components or other short-term data storage component. According to other examples, memory 345 may include one or more long-term storage components, such as a magnetic hard drive, FLASH memory component, or other long term data storage component.

Processor 344 may comprise one or more components of access point 101 configured to execute instructions (e.g., instructions stored in memory 345). Processor 344 may comprise, for example, a general purpose computing component (e.g., a central processing unit (CPU), graphics processing unit (GPU)), or other computing component configured to execute instructions stored in memory 345 to operate according to the techniques described herein. For example, functionality described with respect to one or more of data processing module 340, COM module 342, and Internet module 348 may at least in part, comprise instructions executable by processor 344 to cause processor 344 to operate consistently with the techniques described herein. In other examples, functionality of one or more components of access point 101 described herein may be implemented using one or more components specifically configured to perform the described functionality. For example, one or more components of access point 101 described herein may comprise one or more components (e.g., application specific integrated circuit (ASIC), field programmable gate array (FPGA), discrete logic component) specifically configured or arranged to operate according to the techniques described herein.

Internet module 348 may be configured to enable access point 101 to communicate via a larger network, such as the Internet. For example, as described above, Internet module 348 may include one or more hardware or software components configured to enable access point 101 to communicate with computing devices via the Internet using a wired communications protocol. For example, Internet module 348 may include a modem internal or external to access point 101, such as a cable, DSL, T1, or T3 modem configured to enable access point 101 to communicate via a network, such as the Internet. According to other examples, Internet module 348 may enable access point 101 to communicate with a network, such as the Internet, wirelessly. For example, Internet module 348 may comprise one or more hardware or software components of access point 101 configured to enable access point to communicate wirelessly (e.g., via a 3G or 4G cellular network) via a network, such as the Internet.

As depicted in FIG. 3, access point 101 includes a power source 346. Power source 346 may comprise any source of energy configured to power one or more components of access point 101 for operation. For example, power source 346 may comprise an electrical coupling to an external power source (e.g., a wall outlet). According to other examples, for example where access point 101 is a mobile device configured to operate as a wireless access point, power source 346 may comprise an external power source as described above and/or a battery or other form of energy storage component internal to or external from access point 101.

FIG. 3 also illustrates that access point 101 includes a data processing module (DPM) 340 and a communication (COM) module 342. Generally speaking, DPM 340 may receive data from another computing device via Internet module 348, and process data received from Internet module 348. DPM 340 may send data to client device 103A-103F via COM module 342. For example, DPM 340 may arrange data received via Internet module 348 in one or more frames to be sent to client device 103A-103F wirelessly via COM module 342. According to one specific example, DPM 340 may arrange received data in one or more frames according to one or more of the IEEE 802.11X standards for WI-FI wireless communications. In some examples, DPM 340 may also be configured to receive and process data received from client device 103A-103F via COM module 342. For example, DPM 340 may process one or more frames of data or instructions from client device 103A-103F, and send data or instructions from the one or more received frames to another computing device, e.g., via Internet module 348.

In some examples, DPM 340 may store received data in memory 345, prior to sending the received data to client device 103A-103F in the form of one or more frames of data. In some examples, DPM 340 may communicate one or more frames of data stored in memory 345 to client device 103A-103F, after access point 101 has sent client device 103A-103F a beacon 201 that includes a DTIM IE 206 that indicates the one or more frames of data stored in memory 345 are forthcoming from access point 101.

As shown in FIG. 3, client device 103A-103F includes a communications module (COM module) 352, a processor 354, a memory 355, a data processing module (DPM) 350, a power source 356, and a power mode module (PMM) 357.

Memory 355 may include any component of client device 103A-103F configured to store data. For example, memory 355 may include a temporary memory, such one or more random access memory (RAM) components or one or more other short term data storage components. According to other examples, memory 355 may include one or more long term storage components, such as one or more magnetic hard drives, FLASH memory components, or one or more other long-term data storage components.

Processor 354 may comprise one or more components of client device 103A-103F configured to execute instructions (e.g., instructions stored in memory 355). Processor 354 may comprise, for example, a general purpose computing component (e.g., a central processing unit (CPU), graphics processing unit (GPU)), or other computing component configured to execute instructions stored in memory 355 to cause client device 103A-103F to operate as described herein. For example, functionality described with respect to one or more of data processing module 350, DTIM module 358, channel assessment module 359, PMM 357, and/or COM module 352 may at least in part, comprise instructions executable by processor 354 to cause processor 354 to operate cause client device 103A-103F to operate consistent with the techniques described herein. In other examples, one of more modules of access point 101 described herein may also or instead be implemented, at least in part, using one or more components specifically configured to perform the functionality described herein. For example, one or more modules of client device 103A-103F described herein may comprise one or more components (e.g., application specific integrated circuit (ASIC), field programmable gate array (FPGA), discrete logic component) specifically configured or arranged to operate according to the techniques described herein. The various modules of client device 103A-103F described herein may be implemented using any combination of hardware, software, firmware, discrete logic components.

As one specific example, COM module 352 may include instructions executable by processor 354 to cause client device 103A-103F to communicate with access point 101 and/or one or more circuits specifically configured to cause client device 103A-103F to communicate with access point 101. For example, COM module 352 may include one or more components (e.g., a WI-FI integrated circuit (WI-FI IC) configured to enable client device 103A-103F to communicate using one or more of the IEEE 802.11X standards for WI-FI communication.

Power source 356 may include any component of client device 103A-103F configured to store or access power to operate one or more components of client device 103A-103F, such as COM module 352, DPM 350, PMM 357, or other component of client device 103A-103F. In some examples, power source 356 of client device 103A-103F may include limited power source, such as a battery. In other examples, power source 356 may comprise an external power source, such as an external coupling to a wall outlet, or a battery external to client device 103A-103F. In some examples, where client device 103A-103F uses a limited power source such as an internal battery, it may be desirable to minimize power consumption of client device 103A-103F, in order to increase a battery life of client device 103A-103F.

To reduce power consumption of client device 103A-103F, PMM 357 depicted in FIG. 3 may operate client device 103A-103F in different modes of operation. For example, PMM 357 may cause client device 103A-103F to operate in an active mode, or a low power consumption mode to reduce power consumption of client device 103A-103F. According to such a low power consumption mode, one or more components of client device 103A-103F may be turned off, and/or operated at a slower rate and/or with a reduced power supply (e.g., a reduce supply voltage and/or current) in comparison to an active mode of operation. For example, in an active mode of client device 103A-103F, PMM 357 may cause COM module 352 (e.g., a WI-FI integrated circuit (IC) of client device 103A-103F to be turned on (e.g., connected to power source 356) such that client device 103A-103F may communicate with access point 101. According to this example, in a low power consumption mode, PMM 357 may turn off COM module 352, such that COM module 352 may consume little or no power from power source 356. For example, according to the low power consumption module, PMM 357 may disconnect COM module 352 from power source 356, such that COM module 352 may not consume any power. According to other examples, according to a low power consumption mode, PMM 357 may cause DPM 350 not to process data received by access point 101.

As shown in FIG. 3, DPM 350 includes a DTIM module 358. According to the techniques described herein, DPM 350 may receive a header 204 of a beacon 201 as depicted in FIG. 2. DPM 350 may then begin receiving IEs 205. DTIM module 358 may determine that DTIM IE 206 comprises the DTIM IE. For example, DTIM module 358 may determine that DTIM IE 206 is the DTIM IE based on information of header 204, or information in a header of DTIM IE 206. DTIM module 358 may further determine, based on DTIM IE 206, whether one or more frames of data are forthcoming from access point 101. If the DTIM 206 indicates that one or more frames of data are forthcoming from access point 101, client device 103A-103F may continue to operate in an active mode, to receive the forthcoming frames of data following DTIM IE 206, such as IEs 207. Otherwise, if one or more frames of data are not forthcoming from access point 101, DTIM module 358 may cause client device 103A-103F to be operated in a low power consumption mode (e.g., via PMM 357). Accordingly, client device 103A-103F may not receive data segments following DTIM IE 206.

As also shown in FIG. 3, client device 103A-103F also preferably includes a channel assessment module 359. As described above, one or more parameters including the initial CQM at $T_{CQM1}$, one or more intermediate CQMs, the terminal CQM at $T_{CQM2}$, PTTh, TFTh, N-update, $T_C$, $\Delta_{PT \Delta PT}$, $\Delta_{TF}$ and $\Delta_{CQTh}$ parameters may be used in various manners to enable client device 103A-103F to assess channel conditions so that the validity of the DTIM and other IEs can be gauged independently of FCS verification. Channel assessment module 359 is preferably configured with the set parameters and is also preferably configured to receive channel quality information from the PHY layer in the form of SNR, SNIR, RSSI, Rx-EVM, confidence metrics from the Viterbi output or other suitable measure of signal quality. Channel assessment module 359 is also preferably configured to perform the above comparisons with the thresholds to establish the FCL % confidence of the DTIM and other IEs. Client device 103A-103F also preferably includes timing estimation module 360, which is configured to perform the coarse-adjustment and fine-adjustment estimations regarding the expected TSF range described above. For example, timing estimation module 360 preferably samples per-frame (PPDU) drift information, triggered at each base-interval. In one embodiment, such fine-time stamps may be obtained by any suitable means generally known in state of the art, such as from STF and/or LTF processing.

Although these channel awareness parameters and the techniques of this disclosure may utilized during the reception of any suitable frame, within the context of EBT scheme, it will be appreciated that certain scenarios may involve a client device 103A-103F. In a first example, client device 103A-103F receives beacon 201 in which DTIM IE 206 is not set. In a second example, client device 103A-103F receives beacon 201 in which DTIM IE 206 is set. These two scenarios are discussed in detail below.

In the first noted example of an EBT implementation according to the principles of this disclosure, client device 103A-103F may receive and/or process a validity window such as PTTh zone 210 of beacon 201 followed by DTIM IE 206. Under this example, client device 103A-103F determines, based on the DTIM 206, that frames of data are not forthcoming from access point 101. Since DTIM IE 206 is not set, client device 103A-103F may implement EBT, entering a low power mode and not receiving any information from portions of beacon 201 following DTIM IE 206. As a result, client device 103A-103F may not receive FCS 208 and will be unable to perform the FCS check to validate data of beacon 201.

As discussed above, the validity window may include information regarding important system parameters, including the TSF. This IE may indicate, to a client device 103A-103F, when the client device should awake from a low power mode of operation to receive at least one further beacon from access point 101. For example, the TSF may indicate a counter value, such as a 64-bit timer counter with micro second resolution. Client device 103A-103F may use the TSF to synchronize a TSF timer counter internal to client device 103A-103F with a TSF timer counter of access point 101. In some examples, client device 103A-103F may use the TSF to synchronize operation with access point 101, for example, to compensate for clock drift between internal clock references (e.g., crystal oscillators) of the client device 103A-103F and the access point 101. In yet other examples, the client device may use the TSF to implement other technologies depending upon accurate clock synchronization between access point 101 and client device 103A-103, such as positioning functions. Additional important system parameters communicated during the validity window may include the CSA IE and others.

One of skill in the art will appreciate that it may be desirable to update important system parameters such as the above only when there is reasonable confidence the information received from beacon 201 is valid. When EBT operates to abort beacon reception prematurely, FCS 208 is not received and its validation function is not available. Under situations where access point 101 does not have forthcoming data for a period of time, DTIM IE 206 is not set, FCS 208 is not received, and the TSF or other system parameters may not be updated under conventional EBT techniques.

Accordingly, one aspect of this disclosure is to determine a validity window based on channel awareness that is independent from FCS so that TSF and other system parameters may be updated even during periods when the access point 101 has no pending data for client device 103A-103F. By applying the channel awareness parameters discussed above, a very good indication of the data integrity in the validity window may be determined. For example, a validity window established in relation to an intermediate IE may be used to provide a corresponding FCL for information received within the window upstream and downstream from the intermediate CQM determination. Likewise, the channel parameters CQM and CQTh, coupled with duration (PTTh) and coherence parameters (TC) may be used to provide a high degree of confidence in data segments received prior to an intermediate IE, such as DTIM IE 206, provided $\Delta_{PT}$ is less than or equal to the lesser of PTTh or $T_C$ for a validity window corresponding to PTTh zone 210. If the $\Delta_{PT}$ satisfies this condition, CQM is compared to CQTh. As will be appreciated, the CQM at a given time is available from the physical layer (PHY) of client device 103A-103F. Accordingly, if the signal quality meets the threshold, data within the PTTh zone 210 can be treated as valid. Thus, when $\Delta_{PT}$ is less than the PTTh, it can be seen that IEs 205 received during PTTh zone 210 are transmitted during a period of time when the channel conditions are unlikely to have changed. Similarly, when $\Delta_{PT}$ is less than $T_C$, such IEs 205 are transmitted during a period less than the coherence time. In both situations, the channel assessment indicates that the information received prior to DTIM IE 206 has the established FCL of being valid as the signal quality was adequate at $T_{CQM1}$.

Under the above conditions, the data received by client device 103A-103F prior to the DTIM IE 206 can be identified as correctly decoded data with FCL % confidence. As desired, having this degree of confidence allows the TSF counter and other parameters to be updated. Further, the N-update value may be revised to reflect the validity window or PTTh threshold. In some embodiments, it may be also be desirable to perform a tertiary check before updating the TSF.

For example, the received value can be reviewed to determine whether the counter is within an expected range, such as by ensuring the interval is commensurate with the beacon transmission interval. The expected range is a fuzzy function of the beacon interval (BI). As an example, if the BI is 100 ms, the beacon duration is encoded as 100 TU (transmission units) in the TSF. The expected range of the counter is recommended to be within a defined percentage, such as approximately 20%, of the beacon duration, i.e., {80, 120} TUs, assuming the Listen Interval (LI) is 1. For a LI of N, the expected range would be N*{80, 120} TUs. As will be appreciated, this parameter of the algorithm may be modified at desired.

In an alternative embodiment, a more specific bound of the expected TSF range may be employed at a slightly higher hardware and/or software processing cost. By using a priori information of clock drifts, obtained from a fine timing estimation procedure for example, this approach takes advantage of the accuracy of the crystal oscillators used on the access point and on the client device. The accuracy is typically quantified by a Parts-Per-Million (ppm) count and reflects how many clock cycles the clock is expected to drift over a period of time, if left uncorrected. In one example, the Beacon Interval may be 100 ms and the Listen Interval may be 10, which is typical when 802.11X is deployed in power-aware mobile devices, e.g., tablets, cell phones etc. As such, the base-interval, or the interval of inactivity on the client side, may be given as (LI*BI) ms. In this example, then, the base-interval is 1000 ms, or 1 second. Given a clock accuracy of 1000 ppm, which is representative for systems using an internal local oscillator to clock during inactive periods, the clock may be expected to drift by 1 ms during the inactivity period, requiring an early wake-up on the client device and results in a waste of power. While the accuracy of the clocks is generally a fixed quantity on both sides, it is also subject to mild fluctuations due to temperature changes.

Accordingly, in these noted embodiments, the client device preferably records the clock drift over several consecutive base-intervals (BI*LI), with any EBT procedures disabled, for a configurable amount of time, parameterized by $N_{training}$. The outcome of this training is an amount that quantifies the expected clock drift on the access point for the duration of the base interval, i.e., drift-per-base-interval (DPBI). In other words, DPBI indicates how much of a drift the access point may have encountered and directly corresponds to an expected range of variability for the TSF. Further, a complementary DPBI calibration may be done periodically on the client side, subject to significant pre-set temperature variations, the threshold of which may be left as a choice to the system designer. This DPBI re-calibration helps resolve uncertainty on the client side and serves as an input to the early wake-up logic as well. Using such estimations of DPBI, a stricter bound on the expected TSF range may be obtained.

As described above, channel metrics may be used to initially improve confidence in un-verified IEs. In turn, these tertiary TSF checks help ensure that the un-verified TSF is at least bounded by DPBI, from the otherwise exact value. When applying other power saving techniques like skipping multiple, say M, base-intervals, known as telescopic DTIM in state of art, DPBI characterization may be used to extend the expected TSF range to M*DPBI. As will be appreciated the type of tertiary check and the parameters used may be adapted to obtain a desired level of performance.

Preferably, the DPBI re-calibration may involve a coarse-grained and fine-grained estimation. For example, the coarse-grained adjustment may be triggered based on temperature fluctuations on the client device above a pre-set threshold or for cases like telescopic DTIM where the device has remained uncorrected for a several multiple of base-intervals. The fine-grained adjustment, on the other hand, may be configured to occur at each base-interval, when the client device receives a PPDU frame. A fine timing estimate, in terms of a few clock cycles, then may be provided from the physical layer processing, such as baseband processing, and suitable analysis of STF and LTF symbols, to correct the DPBI at each interval.

The coarse grained DPBI adjustment may resolve the local (client side) clock uncertainty and may not necessarily improve the TSF range. As such, the coarse estimate may be used to minimize early wake ups of the client device. The fine grained adjustment, on the other hand, may resolve uncertainty on the access point side and therefore impacts the TSF range directly.

As described above, the validity window may be employed to gain confidence that IEs received during that period are correct absent a typical verification process. Correspondingly, when the above parameters fail to meet the criteria, either when $\Delta_{PT}$ is greater than PTTh DTIM message 220 or when CQM does not exceed CQTh, it may be concluded that a validity window does not exist and that the data segments received prior to DTIM IE 206 are not valid. Such data segments may be identified as incorrectly decoded data with a degree of confidence associated with the FCL. Since there is insufficient reliability for such data, TSF and other system parameters are preferably not updated and the normal EBT procedure may be followed to put client device 103A-103F in low power mode when DTIM IE 206 is not set and discard the data from beacon 201.

Turning to the second noted example of EBT operation, situations in which DTIM IE 206 is set are encountered. In this scenario, client device 103A-103F may continue to receive beacon 201 through termination at FCS 208. If FCS passes, all the data within beacon 201 may be treated as valid. However, even if FCS fails, the data transmitted around DTIM IE 206 may have been received correctly. By employing the channel assessment parameters discussed above, the techniques of this disclosure are used to make a determination of confidence allow for the validity of data transmitted during the PTTh zone 210 and TFTh zone 211. Correspondingly, when sufficient confidence exists, this data may be treated as valid. This will result in a performance improvement as compared to situations when valid data is discarded due to FCS failure.

Specifically, when DTIM IE 206 is set and FCS fails, the error may have occurred either in the DTIM or in a different portion of beacon 201. As will be appreciated from the following discussion, the channel parameters CQM and CQTh in conjunction with distance (TFTh) and coherence ($T_C$) parameters may be employed to provide a strong indication of the data integrity around DTIM IE 206 and to help diagnose the FCS failure.

A first stage of the analysis is directed to the CQM and $\Delta_{PT}$ parameters. If CQM exceeds CQTh, good channel conditions may be determined to exist during receipt of the preamble. Likewise, if $\Delta_{PT}$ is less than the lesser of PTTh or $T_C$, the period of time between the CQM determination and DTIM IE, 206 is sufficiently short to determine that the channel conditions at $T_{CQM1}$ will not have changed substantially. When these two conditions are met, it is preferable to determine that the DTIM IE 206 was correctly decoded, with a confidence of FCL %. Also preferably, a tertiary check may be performed to establish the cause for FCS failure as discussed below Once there is reasonable confidence that DTIM IE 206 was correctly received, the channel assessment parameters may be employed to diagnose at what stage an error occurred, leading to the FCS failure. Specifically, a second stage of the analysis is directed to $\Delta_{TF}$ and $\Delta_{CQTh}$. $\Delta_{TF}$ being greater than the lesser of TFTh or $T_C$ indicates that the length of beacon, particularly due to the number of IEs 207, is sufficiently long that it is likely the channel degraded after receipt of DTIM IE 206, somewhere inside Error Zone 212. Alternatively, the difference between the CQM determined during the preamble at $T_{CQM1}$, and the CQM determined after the receipt of DTIM IE 206 at $T_{CQM2}$, is compared to $\Delta_{CQTh}$. When the difference between the two CQMs exceeds $\Delta_{CQTh}$, it indicates a significant degradation in channel quality. If either of these conditions is met, it is likely a sudden degradation of the channel condition occurred after reception of DTIM IE 206, as a result, for example, of symbol erasures not affecting the DTIM IE.

Therefore, if both the first and second aspects of the analysis agree, client device 103A-103F preferably determines DTIM IE 206 was set correctly. In turn, this allows client device 103A-103F to correctly respond to access point 101, even though FCS failed. For example, when DTIM IE 206 indicates that TIM is set, client device 103A-103F responds to access point 101 with a PS-POLL transmission or when DTIM IE 206 indicates DTIM is set, the client device prepares to receive broadcast data from access point 101. In a further aspect, the fulfillment of these aspects also allows client device 103A-103F to have a confidence of FCL % that data received prior to DTIM IE 206 is valid, allowing system parameters such as TSF and CSA to be updated. If either aspect of the analysis fails, client device 103A-103F may not determine that DTIM IE 206 was correctly decoded and is preferably configured to revert to legacy error handling mechanisms.

Figure 4:
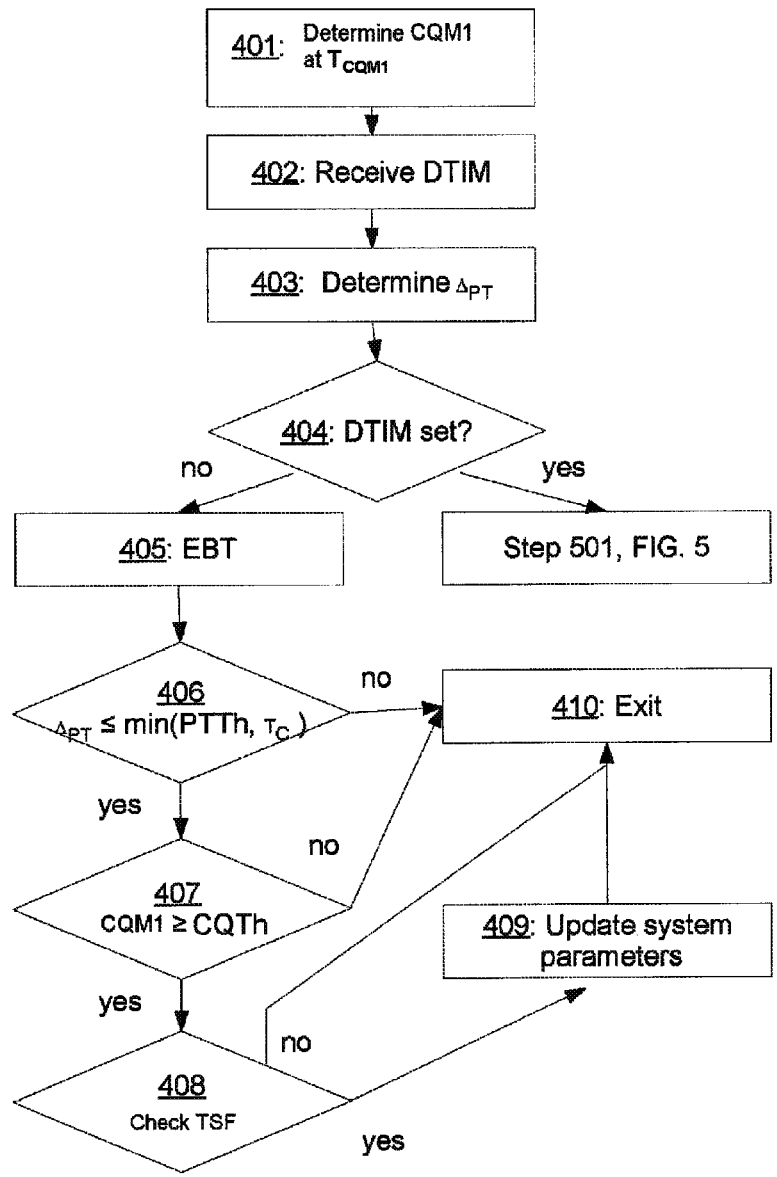
FIG. 4 is a flow diagram that illustrates one example of a method of operating a client device to receive a beacon, according to one embodiment of the invention.

Suitable exemplary algorithms for performing these determinations with respect to the duration metrics are discussed below with respect to FIGS. 4 and 5. FIG. 4 is a flow diagram that illustrates one example of a method of operating a client device consistent with the techniques of this disclosure. The method depicted in FIG. 4 is described with respect to client device 103A-103F depicted in FIG. 3, however other devices may also be used. As shown in FIG. 4, a suitable algorithm for assessing channel conditions to allow the validity of IEs to be determined independently of conventional FCS verification. DPM 350 of client device 103A-103F begins reception of beacon 201 by processing PLCP preamble 202, obtaining CQM1 from the PHY layer at $T_{CQM1}$ in step 401. Next, DPM 350 begins reception of the PDSU frame, including header 204 followed by IEs 205 and then finally DTIM IE 206 at $T_{TIM}$ in step 402. In step 403, channel assessment module 359 determines $\Delta_{PT}$ from $T_{CQM1}$ and $T_{TIM}$. In step 404, if DTIM IE 206 is not set, the algorithm continues to step 405 to implement the EBT feature, such that PMM 357 places client device 103A-103F in low power mode, aborting reception of beacon 201. Alternatively, if DTIM IE 206 is set, the algorithm goes to step 501, discussed below with respect to FIG. 5.

Even though EBT aborts reception of beacon 201, IEs 205 have already been received by DPM 350 and may be used if the validity of the data is determined to a sufficient level of confidence without the reception of FCS 208. To this end, channel assessment module 359 compares $\Delta_{PT}$ to the lesser of PTTh or $T_C$ in step 406. If $\Delta_{PT}$ is less than either of these parameters, the algorithm continues to step 407 in which channel assessment module 359 compares CQM1 to CQTh. If the signal quality meets the threshold, data within the PTTh zone 210 may be determined valid with a confidence of FCL %. Preferably, a tertiary check is performed in step 408 to ascertain whether the TSF value received from IEs 205 is within an expected range.

In one embodiment, the interval may be compared with the beacon transmission interval such that the received TSF is within a defined range, such as within approximately 20%, of the exact expected TSF. In another preferred embodiment, the expected range may be more tightly bound by combining with clock accuracies (ppm count) and a priori characterization of the DPBI as described above. The drift refers to clock-drift over a period of time, subject to clock ppm count, and base interval refers to the fundamental sleep interval of the client device, given by (BI*LI) ms. Preferably, a periodic coarse-adjustment to the DPBI may be based upon temperature fluctuations around pre-set thresholds. Also preferably, a fine-adjustment may be triggered at each base-interval by taking per-frame (PPDU) drift information. Such fine-time stamps can be obtained by any suitable means generally known in state of the art, such as from STF and/or LTF processing. As described above, timing estimation module 360 is preferably configured to provide these estimations.

With a successful check in step 408, the algorithm continues to step 409, in which channel assessment module 359 authorizes system parameters such as TSF and CSA to be updated using information from IEs 205. As described above, an established N-update value may be implemented when the CQTh is met. Alternatively, the N-update value may be dynamically updated based on the relationship of CQM at $T_{CQM1}$ to CQTh, when the first CQM is more than CQTh by a pre-determined margin. In one embodiment, such a margin to number of IEs to update can be pre-computed and stored in a look-up table within the DTIM module 358. The N-update value corresponds to the number of IEs in PTTh zone 210 and TFTh zone 211 that may be considered valid. If $\Delta_{PT}$ is not less than PTTh or $T_C$ in the comparison of step 405, or if the signal quality is not sufficient as determined in step 407, the algorithm terminates at step 410 and data from PTTh zone 210 is preferably discarded.

Figure 5:
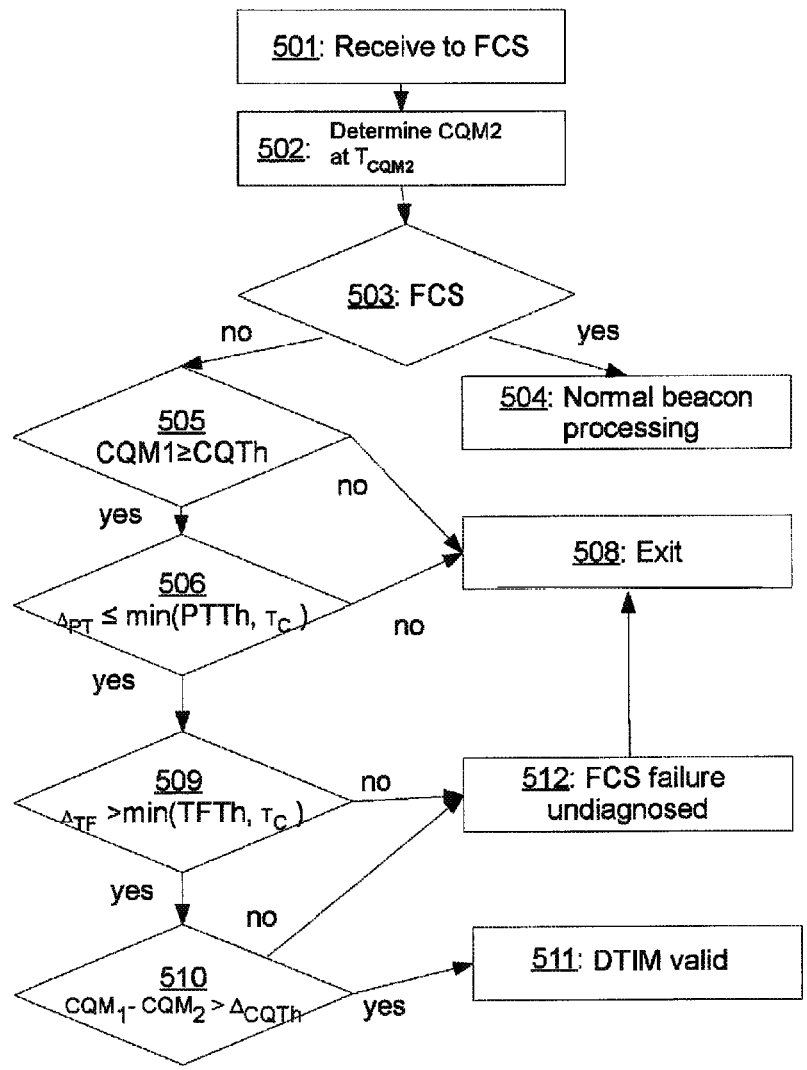
FIG. 5 is a flow diagram that illustrates another example of a method of operating a client device to receive a beacon, according to one embodiment of the invention.

Turning now to FIG. 5, a flow diagram that illustrates another example of a method of operating a client device consistent with the techniques of this disclosure is depicted. As indicated above with regard to step 404, if DTIM is set, DPM 350 continues to receive beacon 201 following DTIM IE 206, including IEs 207 and terminating with FCS 208 at $T_{FCS}$ in step 501. Channel assessment module 359 also determines $\Delta_{TF}$ from $T_{TIM}$ and $T_{FCS}$. Concurrently, channel assessment module 359 sets $T_{CQM2}$ based upon TFTh and computes CQM2 at $T_{CQM2}$ from information from the PHY layer of client device 103A-103F in step 502. Next, the data from FCS 208 is used to determine the validity of beacon 201 in step 503. If FCS passes, the algorithm continues to step 504 and all data from beacon 201 is treated as valid and client device 103A-103F operates conventionally. Alternatively, if FCS fails, channel assessment module 359 determines whether CQM1 at $T_{CQM1}$ exceeds CQTh in step 505 and then determines whether $\Delta_{PT}$ is less than the lesser of PTTh or $T_C$ in step 506. If either condition is not met in step 505 or 506, the algorithm exits to step 508, preferably discarding the data from beacon 201 and executing legacy error handling mechanisms.

If both conditions from steps 505 and 506 are met, the channel assessment parameters are preferably employed to diagnose the stage at which errors receiving beacon 201 occurred leading to the FCS failure. Accordingly, in step 509 channel assessment module 359 determines whether $\Delta_{TF}$ is greater than the lesser of TFTh or $T_C$ to assess the length of beacon 201 following DTIM IE 206. For example, if $\Delta_{TF}$ is greater than TFTh, this indicates there is an Error Zone 212 as the channel may reasonably be assumed to have varied sufficiently to cause incorrect data decoding. The algorithm then continues to step 510, to determine the degree to which channel conditions have changed by $T_{CQM2}$ such that CQM2 is compared to CQM1 to ascertain whether channel conditions have changed in fact. If the difference between CQM2 and CQM1 meets the $\Delta_{CQTh}$, it may be determined that channel conditions have changed sufficiently to account for the FCS failure within the error zone 212.

Thus, if $\Delta_{TF}$ is not sufficiently long as determined from step 509 or if the difference in CQM is less than $\Delta_{CQTh}$, there may be insufficient support to conclude that the FCS failure was a result of changing channel conditions. Without an indication of the reason for FCS failure, the algorithm preferably exits to step 508 and the data is discarded. Otherwise, it may be determined that the FCS failure may be attributed to either the length of beacon 201 or the observed change in signal conditions. Thus, if both conditions of steps 509 and 510 are met, the algorithm proceeds to step 511 and channel assessment module 359 preferably validates DTIM IE 206 and operates client device 103A-103F accordingly, such as by allowing client device 103A-103F to correctly respond to access point 101 with a PS-POLL transmission or by preparing to receive broadcast data as warranted.

Further, under these conditions channel assessment module 359 may also preferably determine that data segments received in IEs 205 prior to DTIM IE 206 are also valid, allowing system parameters such as TSF and CSA to be updated subject to the algorithm described above regarding FIG. 4.

Figure 6:
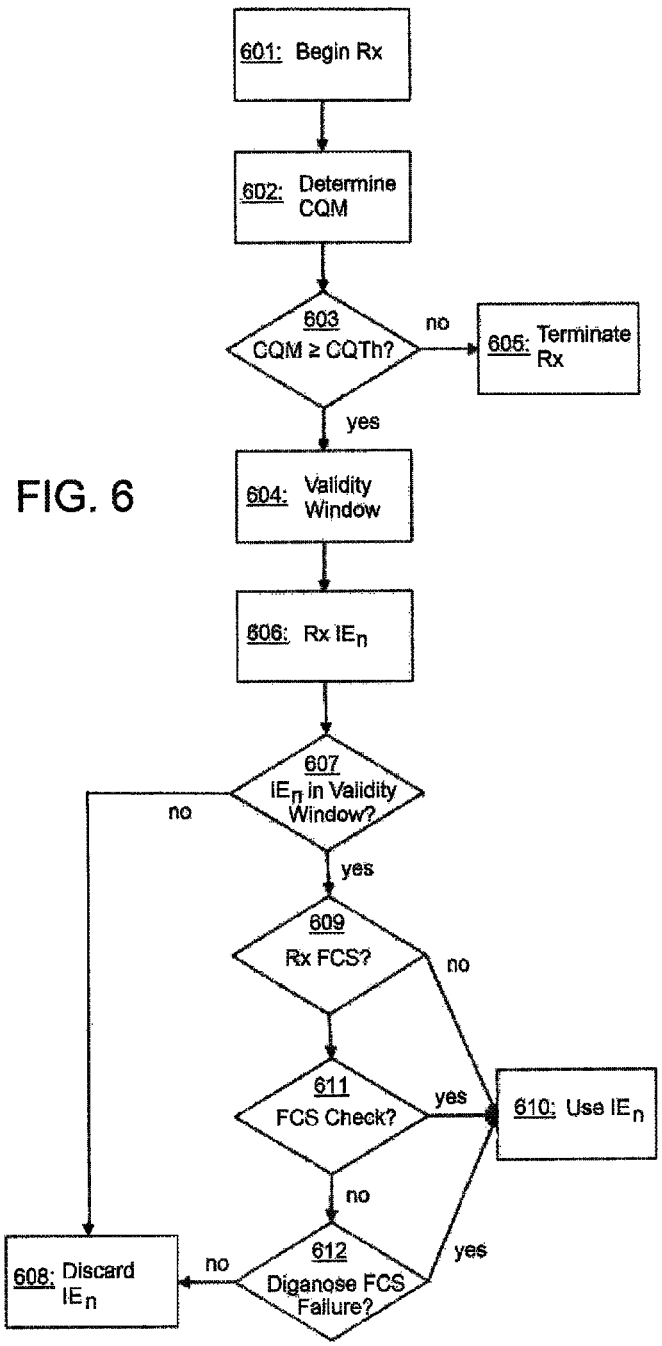
FIG. 6 is a flow diagram that illustrates an example of a method of operating a client device to receive a frame, according to one embodiment of the invention.

While the examples discussed above in relation to FIGS. 4 and 5 are directed to client device 103A-103F receiving beacon frame 201 and optionally implementing an EBT scheme, FIG. 6 depicts a more generalized application of the techniques of this disclosure in the context of using the channel awareness parameters to determine a validity window with respect to an intermediate IE within any suitable frame. Beginning with step 601, DPM 350 of client device 103A-103F starts reception of a frame by processing the PLCP preamble followed by the body of the PDSU frame. For the purposes of this disclosure, the portion of the PDSU frame following the header may be considered to comprise a sequence of IEs. In step 602, channel assessment module 359 determines an intermediate CQM at time $T_i$ and compares the determined CQM to an appropriate CQTh in step 603. If the intermediate CQM is greater than or equal to CQTh, channel assessment module 359 may establish a validity window in reference to $T_i$, having a duration that depends at least in part on the $T_c$ of the channel in step 604. However, if CQM does not exceed CQTh, it may indicate that channel conditions are insufficient for proper reception and reception of the frame may be terminated in step 605. In step 606, DPM 350 may process a given intermediate IE, $IE_n$. As will be appreciated, the order of step 606 in relation to steps 602 and 603 may be reversed if $IE_n$ is received before the intermediate CQM is determined or may occur substantially simultaneously.

Next, in step 607, channel assessment module 359 determines whether $IE_n$ falls with the validity window. If not, $IE_n$ may be discarded in step 608. Otherwise, the algorithm may branch at step 609 depending upon whether DPM 350 continues to receive the frame through the FCS. If not, the algorithm may continue to step 610 and $IE_n$ may be treated as correctly received with a corresponding FCL. Optionally, as indicated by the path to step 605, reception of the frame may be terminated to save power following verification of $IE_n$. On the other hand, if the FCS is received, its validity is determined in step 611. The algorithm may also proceed to step 610 if the FCS is valid, as this provides further indication that $IE_n$ was correctly received. However, if the FCS is not valid, the algorithm proceeds to step 612 to diagnose the cause of the FCS failure. Following the procedures described above with regard to FIG. 5, if a suitable reason may be determined for the failure of the FCS, the algorithm still proceeds to step 610 and $IE_n$ may be utilized. If the cause of the FCS failure cannot be determined, the algorithm may end with step 608 such that $IE_n$ may be treated as being incorrectly received.

Figure 7:
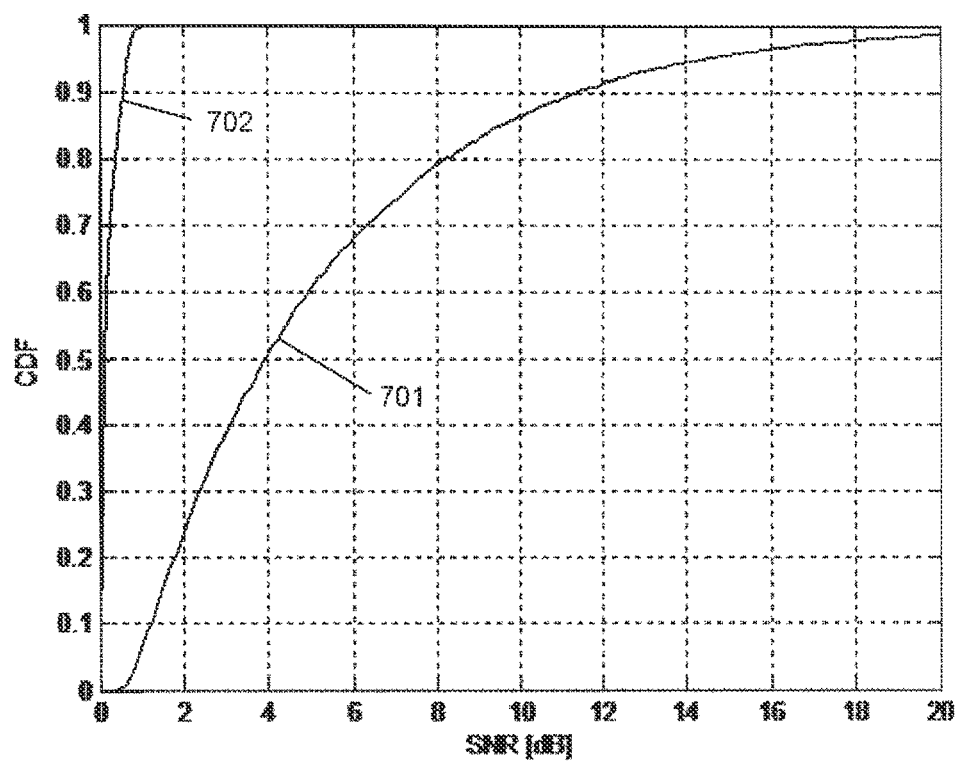
FIGS. 7-10 depict experimental results using a signal to noise ratio based channel quality metric, according to embodiments of the invention.
Figure 8:
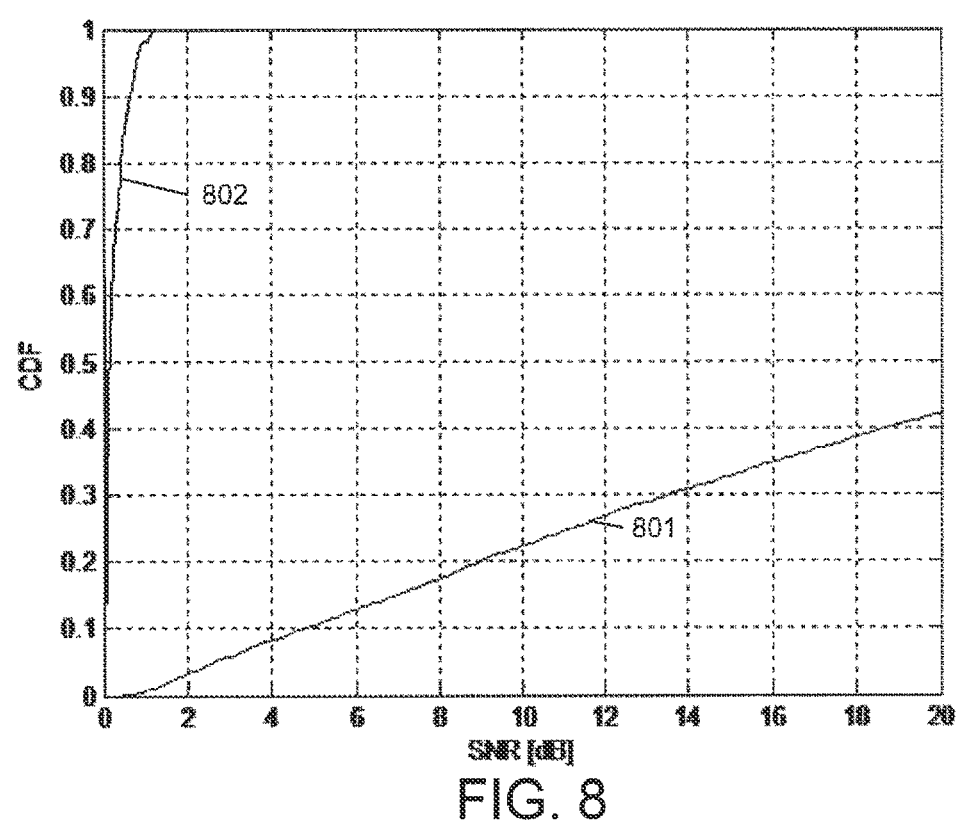
Figure 9:
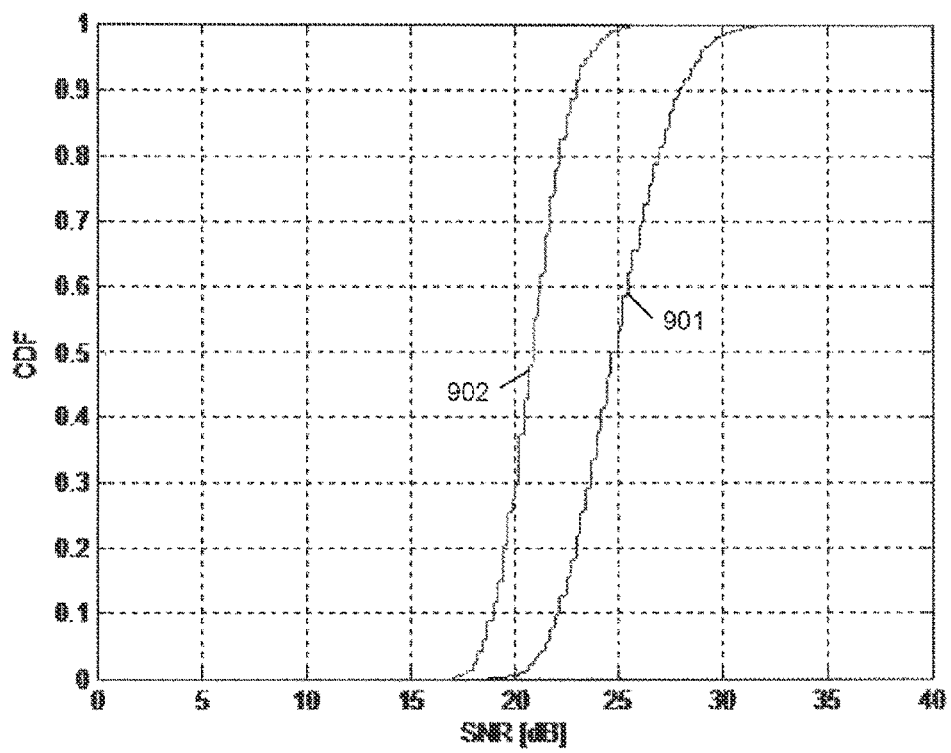
Figure 10:
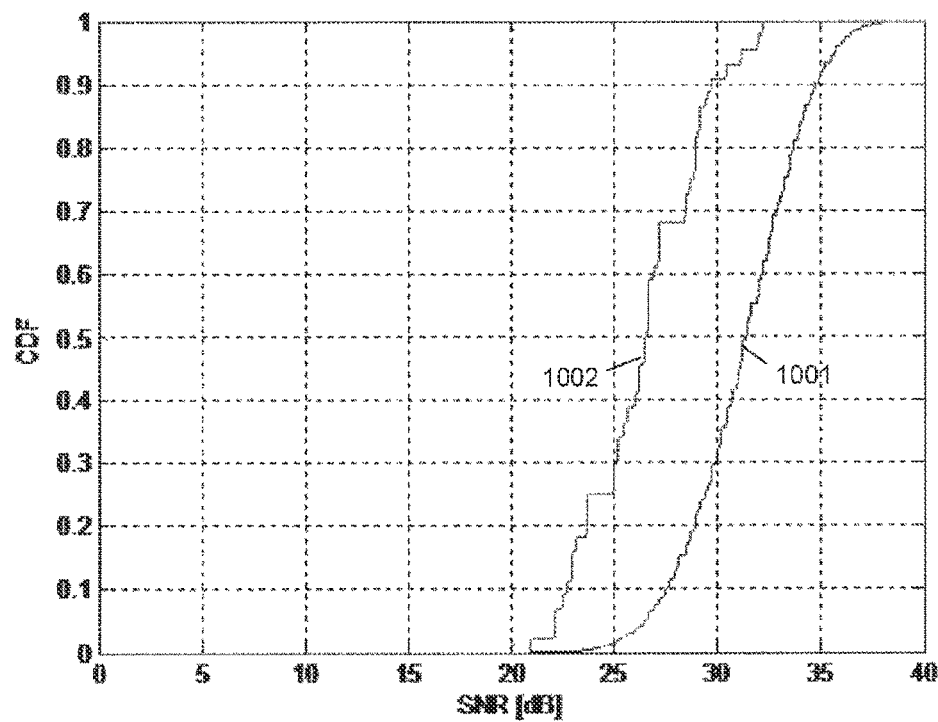

The suitability of the techniques of this disclosure may be seen with regard to experimental comparisons of a CQM based upon SNR to the validity of the received frame as represented by the cumulative distribution function (CDF) as shown in FIGS. 7-10 for various SNRs taken under non line of sight (D-NLOS) conditions. The frames used for these simulations are 100B packets so these results may be extended to the reception of longer frames by performing CQM determinations of SNR at intervals corresponding to 100 bytes at the particular data rate being employed. In particular, FIG. 7 depicts results at an SNR averaging 6 dB at 1 Mbps and an average packet error rate (PER) of 10%. Curve 701 represents the SNR-based CQM of error-free frames while curve 702 represents the SNR-based CQM of erroneous frames. By employing a CQTh based on the SNR exceeding 2 dB, erroneous data would be validated less than 0.1% of the time while about 25% of correct frames may be designated as erroneous. FIG. 8 depicts results at an SNR averaging 15 dB at 1 Mbps and an average PER of 1%. Curve 801 represents the SNR-based CQM of error-free frames while curve 802 represents the SNR-based CQM of erroneous frames. By employing a CQTh based on the SNR exceeding 2 dB, erroneous data would be validated less than 0.1% of the time while about 3% of correct frames may be designated as erroneous. FIG. 9 depicts results at an SNR averaging 28 dB at 65 Mbps and an average PER of 10%. Curve 901 represents the SNR-based CQM of error-free frames while curve 902 represents the SNR-based CQM of erroneous frames. By employing a CQTh based on the SNR exceeding 2 dB, erroneous data would be validated less than 0.1% of the time while about 65% of correct frames may be designated as erroneous. Finally, FIG. 10 depicts results at an SNR averaging 36 dB at 1 Mbps and an average PER of 0.5%. Curve 1001 represents the SNR-based CQM of error-free frames while curve 1002 represents the SNR-based CQM of erroneous frames. By employing a CQTh based on the SNR exceeding 2 dB, erroneous data would be validated less than 0.2% of the time while about 3% of correct frames may be designated as erroneous.

Figure 11:
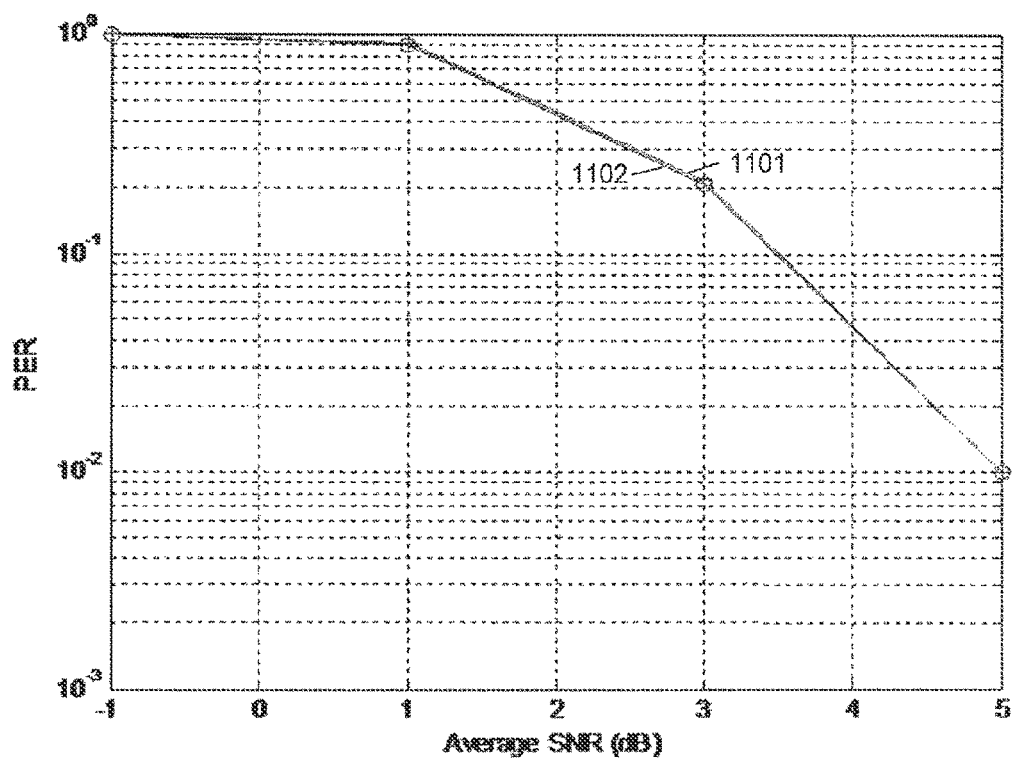
FIGS. 11 and 12 depict experimental results using a Viterbi output based channel quality metric, according to embodiments of the invention.
Figure 12:
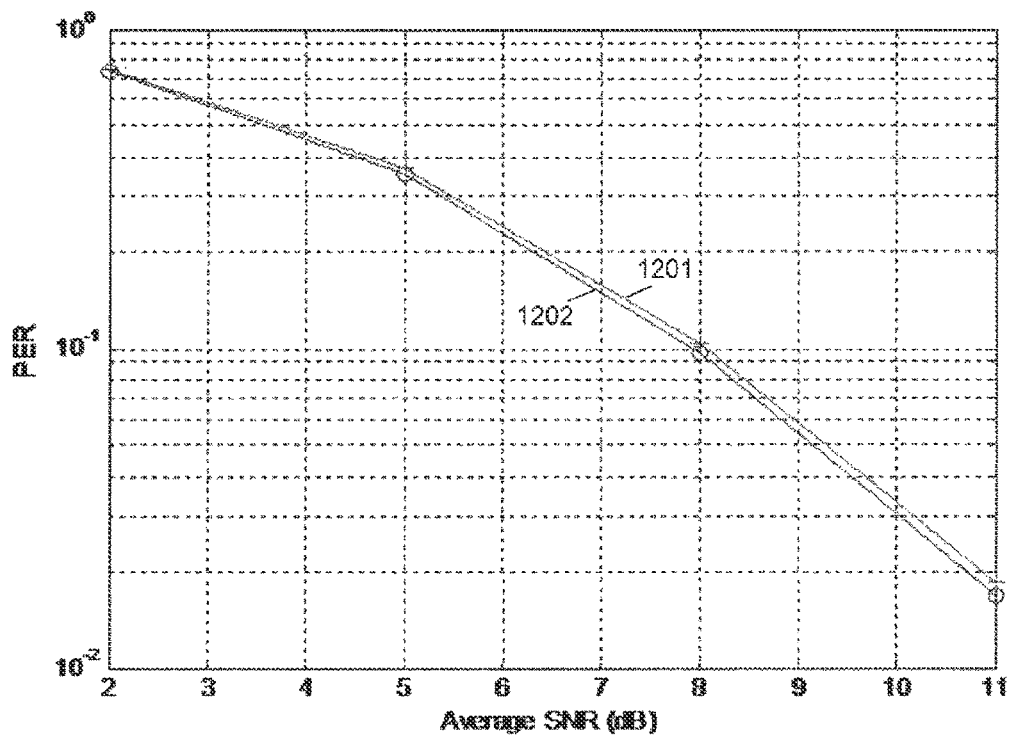

Further examples demonstrate the suitability of this disclosure with regard to experimental comparisons of a CQM based upon a Viterbi error metric derived from the minimum path metric as described above to PER as shown in FIGS. 11 and 12. In particular, FIG. 11 depicts results under average Gaussian white noise (AWGN) test conditions using a scaling threshold of 0.9. Curve 1101 represents the PER of frames filtered by the Viterbi error metric and curve 1102 represents the PER of unfiltered frames as reference. As indicated by the close relationship of the two curves, filtering by the Viterbi error metric results in almost no performance degradation. Nevertheless, the use of a threshold of 0.9 provides detection of approximately 99% of all false positive frames in which there are errors in the received bits of the L-SIG, but conventional verification based on parity, rate and a check of the reserved bits indicates correct decoding. Similarly, FIG. 12 depicts results under D-NLOS conditions and also employs a scaling threshold factor of 0.9. Curve 1201 represents the PER of frames filtered by the Viterbi error metric and curve 1202 represents the PER of unfiltered frames as reference. Again, the close relationship of the two curves indicates minimal performance degradation resulting from Viterbi error metric filtering while the threshold provides detection of approximately 93% of all false positive frames.

The techniques described herein may be implemented in hardware, software, firmware, or any combination thereof. Any features described as modules or components may also be implemented together in an integrated logic device or separately as discrete but interoperable logic devices. If implemented in software, the techniques may be realized at least in part by a tangible computer-readable storage medium comprising instructions that, when executed, performs one or more of the methods described above. The tangible computer-readable data storage medium may form part of a computer program product, which may include packaging materials.

Described herein are presently preferred embodiments. However, one skilled in the art that pertains to the present invention will understand that the principles of this disclosure can be extended easily with appropriate modifications to other applications.

What is claimed is:

1. A client device for communicating with a wireless access point, the client device comprising:
   a data processing module configured to receive at least a portion of a frame transmitted by the access point to an intermediate location within the frame; and
   a channel assessment module configured to determine a validity window with respect to the intermediate location when at least one channel quality metric is greater than or equal to a given threshold, wherein data processing module is configured to validate information received within the validity window,
   wherein the channel assessment module is further configured to determine the validity window by comparing a first duration metric corresponding to a time period between a preamble of the frame and the intermediate location to a coherence time, determining whether a first channel quality metric determined from the preamble exceeds a given threshold, comparing a second duration metric corresponding to a time period between the intermediate location and a verification field to a coherence time and comparing the difference between the first channel quality metric and a second channel quality metric to a channel quality difference threshold.

2. The client device of claim 1, wherein the channel assessment module is configured to determine the validity window by setting a range of symbols upstream and downstream of a period of time when the channel quality metric is determined.

3. The client device of claim 2, wherein the channel quality metric comprises confidence metrics from the output of a Viterbi decoder.

4. The client device of claim 1, wherein the channel assessment module is configured to determine the validity window based upon a coherence time for a channel used to transmit the frame.

5. The client device of claim 1, wherein the channel quality metric comprises a receiver error vector magnitude.

6. The client device of claim 1, wherein the channel quality metric is based upon signal strength of the frame.

7. The client device of claim 1, wherein the given threshold is based upon a modulation coding set used for the transmitted frame.

8. The client device of claim 1, wherein the client device is configured to update system parameters based upon the information received within the validity window.

9. The client device of claim 1, wherein the client device is configured to terminate reception of the frame when the channel quality metric does not exceed the given threshold.

10. The client device of claim 1, wherein the channel assessment module is further configured to determine a plurality of validity windows, such that each validity window is determined in reference to a channel quality metric determined at a different time during the frame.

11. The client device of claim 1, wherein the frame is received though a verification field and the channel assessment module is further configured to diagnose a failure of the verification field on the basis of a duration metric and a difference between a first channel quality metric measured during a preamble of the frame and a second channel quality metric measured during a time corresponding to the intermediate location, wherein the information within the validity window is validated when the failure diagnosis is attributable to deteriorating channel conditions.

12. The client device of claim 1, wherein the information received within the validity window comprises a DTIM information element and wherein the client device if configured to terminate reception of the frame and enter a low power mode if the DTIM information element indicates there is no pending data at the access point for the client device.

13. The client device of claim 1, wherein the channel assessment module is further configured to assign a confidence level to the validity window based upon the channel quality metric and the given threshold.

14. A method for wireless communication with an access point, comprising:
receiving at least a portion of a frame transmitted by the access point to an intermediate location within the frame with a client device;
determining a channel quality metric; establishing a validity window when the channel quality metric is greater than or equal to a given threshold; and
validating information from the frame received within the validity window, wherein establishing the validity window comprises comparing a first duration metric corresponding to a time period between a preamble of the frame and the intermediate location to a coherence time, determining whether a channel quality metric determined from the preamble exceeds a given threshold, comparing a second duration metric corresponding to a time period between the intermediate location and a verification field to a coherence time and comparing the difference between the first channel quality metric and a second channel quality metric to a channel quality difference threshold.

15. The method of claim 14, wherein establishing the validity window comprises setting a range of symbols upstream and downstream of a period of time when the channel quality metric is determined.

16. The method of claim 15, wherein determining the channel quality metric comprises obtaining confidence metrics from the output of a Viterbi decoder.

17. The method of claim 14, wherein establishing the validity window comprises using a range based upon a coherence time for a channel used to transmit the frame.

18. The method of claim 14, wherein determining the channel quality metric comprises measuring a receiver error vector magnitude.

19. The method of claim 14, wherein determining the channel quality metric comprises measuring a signal strength of the frame.

20. The method of claim 14, wherein the given threshold is based upon a modulation coding set used for the transmitted frame.

21. The method of claim 14, further comprising updating system parameters of the client device based upon the information received within the validity window.

22. The method of claim 14, further comprising terminating reception of the frame when the channel quality metric does not exceed the given threshold.

23. The method of claim 14, further comprising determining a plurality of channel quality metrics at different times during the frame and establishing a plurality of validity windows, each validity window corresponding to the plurality of channel quality metrics.

24. The method of claim 14, wherein the frame is received though a verification field, further comprising diagnosing a failure of the verification field on the basis of a duration metric and a difference between a first channel quality metric measured during a preamble of the frame and a second channel quality metric measured during a time corresponding to the intermediate location, wherein the information within the validity window is validated when the failure diagnosis is attributable to deteriorating channel conditions.

25. The method of claim 14, wherein the validated information includes a DTIM information element, further comprising terminating reception of the frame and placing the client device in a low power mode if the DTIM information element indicates there is no pending data at the access point for the client device.

26. The method of claim 14, further comprising assigning a confidence level to the validity window based upon the channel quality metric and the given threshold.

* * * * *